US012508091B2

(12) United States Patent
Itkowitz et al.

(10) Patent No.: US 12,508,091 B2
(45) Date of Patent: Dec. 30, 2025

(54) SYSTEMS AND METHODS FOR SWITCHING CONTROL BETWEEN MULTIPLE INSTRUMENT ARMS

(71) Applicant: INTUITIVE SURGICAL OPERATIONS, INC., Sunnyvale, CA (US)

(72) Inventors: Brandon D. Itkowitz, San Jose, CA (US); Pushkar Hingwe, Los Altos, CA (US)

(73) Assignee: INTUITIVE SURGICAL OPERATIONS, INC., Sunnyvale, CA (US)

( * ) Notice: Subject to any disclaimer, the term of this patent is extended or adjusted under 35 U.S.C. 154(b) by 1119 days.

(21) Appl. No.: 16/630,134

(22) PCT Filed: Jul. 12, 2018

(86) PCT No.: PCT/US2018/041893
§ 371 (c)(1),
(2) Date: Jan. 10, 2020

(87) PCT Pub. No.: WO2019/014493
PCT Pub. Date: Jan. 17, 2019

(65) Prior Publication Data
US 2020/0163731 A1 May 28, 2020

Related U.S. Application Data

(60) Provisional application No. 62/532,097, filed on Jul. 13, 2017.

(51) Int. Cl.
*A61B 1/00* (2006.01)
*A61B 1/045* (2006.01)
(Continued)

(52) U.S. Cl.
CPC .......... *A61B 34/35* (2016.02); *A61B 1/00149* (2013.01); *A61B 1/00193* (2013.01);
(Continued)

(58) Field of Classification Search
CPC ..... A61B 34/35; A61B 34/76; A61B 1/00149; A61B 1/00193; A61B 1/045; A61B 2034/301
See application file for complete search history.

(56) References Cited

U.S. PATENT DOCUMENTS 6,113,395 A * 9/2000 Hon ....................... G09B 23/28
434/262
6,493,608 B1 * 12/2002 Niemeyer .............. A61B 34/70
700/255
(Continued)

FOREIGN PATENT DOCUMENTS

WO    WO-02065933 A2    8/2002
WO    WO-2006124390 A2    11/2006
(Continued)

OTHER PUBLICATIONS

International Preliminary Report on Patentability for Application No. PCT/US2018/041893, mailed on Jan. 23, 2020, 7 pages.
(Continued)

*Primary Examiner* — Michael J Carey
*Assistant Examiner* — William B Chou
(74) *Attorney, Agent, or Firm* — Haynes & Boone, LLP.

(57) ABSTRACT

Systems and methods for reassigning control by a master controller between a plurality of teleoperational instruments is provided herein. An exemplary method includes detecting activation of an instrument reassignment input, computing proxy positions of at least a first instrument and a second instrument of the plurality of teleoperational instruments, and computing a proxy position of the master controller. The
(Continued)

exemplary method may also include receiving input from the master controller associating the proxy position of the master controller with the proxy position of the second medical instrument and assigning control of the second instrument to the master controller based on the association between the proxy position of the master controller with the proxy position of the second instrument.

20 Claims, 15 Drawing Sheets

(51) Int. Cl.
  *A61B 34/00* (2016.01)
  *A61B 34/35* (2016.01)
  *A61B 34/30* (2016.01)
(52) U.S. Cl.
  CPC .............. *A61B 1/045* (2013.01); *A61B 34/76* (2016.02); *A61B 2034/301* (2016.02)

(56) References Cited

U.S. PATENT DOCUMENTS

| | | | |
|---|---|---|---|
| 9,516,996 | B2 | 12/2016 | Diolaiti et al. |
| 10,130,429 | B1* | 11/2018 | Weir .................. A61B 34/76 |
| 2006/0241414 | A1 | 10/2006 | Nowlin et al. |
| 2009/0326322 | A1 | 12/2009 | Diolaiti |
| 2010/0082039 | A1* | 4/2010 | Mohr .................. B25J 9/1692 |
| | | | 700/83 |
| 2010/0228264 | A1 | 9/2010 | Robinson et al. |
| 2012/0071892 | A1 | 3/2012 | Itkowitz et al. |
| 2014/0313172 | A1* | 10/2014 | Moe .................. A61B 17/00 |
| | | | 345/184 |
| 2016/0270867 | A1* | 9/2016 | Scholan .................. A61B 34/70 |
| 2017/0189130 | A1 | 7/2017 | Weir |
| 2018/0296290 | A1* | 10/2018 | Namiki .................. B25J 9/1697 |
| 2018/0325604 | A1* | 11/2018 | Atarot .................. A61B 5/7475 |
| 2018/0338806 | A1* | 11/2018 | Grubbs .................. A61B 34/30 |
| 2019/0133689 | A1* | 5/2019 | Johnson .................. G09B 9/00 |

FOREIGN PATENT DOCUMENTS

| | | |
|---|---|---|
| WO | WO-2007005555 A2 | 1/2007 |
| WO | WO-2011143338 A1 | 11/2011 |
| WO | WO-2013005862 A1 | 1/2013 |
| WO | WO-2015142953 A1 | 9/2015 |
| WO | WO-2015142956 A1 | 9/2015 |
| WO | WO-2016149345 A1 | 9/2016 |

OTHER PUBLICATIONS

Extended European Search Report for Application No. EP18831493.4 mailed on Mar. 2, 2021, 8 pages.
International Search Report and Written Opinion for Application No. PCT/US2018/041893, mailed on Nov. 27, 2018, 20 pages (ISRG09720/PCT).
Vertut, Jean and Phillipe Coiffet, Robot Technology: Teleoperation and Robotics Evolution and Development, English translation, Prentice-Hall, Inc., Inglewood Cliffs, NJ, USA 1986, vol. 3A, 332 pages.
Extended European Search Report for Application No. EP24158473.9, mailed on Aug. 22, 2024, 09 pages.

* cited by examiner

SYSTEMS AND METHODS FOR SWITCHING CONTROL BETWEEN MULTIPLE INSTRUMENT ARMS

CROSS-REFERENCE TO RELATED APPLICATIONS

This patent application is the U.S. national phase of International Application No. PCT/US2018/041893, filed Jul. 12, 2018, which designated the U.S. and claims priority to and the benefit of the filing date of U.S. Provisional Application 62/532,097, filed Jul. 13, 2017, all of which are incorporated by reference herein in their entirety.

FIELD

The present disclosure is directed to medical systems and methods for use in minimally invasive teleoperational medical procedures, and more particularly to systems and methods for switching control between a plurality of instrument arms.

BACKGROUND

Minimally invasive medical techniques are intended to reduce the amount of extraneous tissue that is damaged during medical procedures, such as diagnostic or surgical procedures, thereby reducing patient recovery time, discomfort, and harmful side effects. Minimally invasive teleoperational medical systems have been developed to increase a physician's dexterity and to avoid some of the limitations on traditional minimally invasive techniques. In teleoperated procedures, the physician uses some form of remote control, e.g., a servomechanism or the like, to manipulate medical instrument movements, rather than directly holding and moving the instruments by hand. In teleoperated systems, the physician can be provided with a view of the interventional site at the surgical workstation. While viewing a two- or three-dimensional image of the interventional site on a display, the physician performs the procedure or procedures on the patient by manipulating master control devices, which in turn control motion of the servomechanically operated instruments.

In robotically-assisted teleoperated procedures, the physician typically operates a master controller to control the motion of surgical instruments at the interventional site from a location that may be remote from the patient (e.g., across the operating room, in a different room, or a completely different building from the patient). The master controller usually includes one or more hand input devices, such as hand-held wrist gimbals, joysticks, exoskeletal gloves or the like, which are operatively coupled to the instruments that are releasably coupled to a patient side "slave" manipulator. The configuration and motion of the master controller controls the instrument's position, orientation, and articulation at the interventional site via the patient side "slave" manipulator. The slave is an electro-mechanical assembly which includes a plurality of arms, joints, linkages, servo motors, etc. that are connected together to support and control the surgical instruments. In a given medical procedure, the three or more instruments may be introduced to the interventional site, often through one or more cannulas extending into a body cavity.

For some minimally invasive procedures, a single operator may need to switch control assignment of a particular master controller from a first instrument to another instrument. Improved systems and methods are needed for enabling an operator to adjust control assignments as it necessary or preferred to perform the procedure.

SUMMARY

The embodiments of the invention are best summarized by the claims that follow the description.

Consistent with some embodiments, one general aspect includes a method of reassigning control by a master controller among a plurality of teleoperational instruments, the method including: detecting, by a control system, activation of an instrument reassignment input; computing, by the control system, proxy positions of at least a first instrument and a second instrument of the plurality of teleoperational instruments; computing, by the control system, a proxy position of the master controller; receiving, by the control system, input from the master controller associating the proxy position of the master controller with the proxy position of the second instrument; and assigning, by the control system, control of the second instrument to the master controller based on the association between the proxy position of the master controller with the proxy position of the second instrument. Other embodiments of this aspect include corresponding computer systems, apparatus, and computer programs recorded on one or more computer storage devices, each configured to perform the actions of the methods.

Consistent with some other embodiments, another general aspect includes a teleoperational robotic system including: a teleoperational assembly including a plurality of robotic arms; a master controller configured to receive input from an operator; and a plurality of instruments disposed on the plurality of robotic arms, where the instruments are controllable by a control system based on the received input, where the control system is configured to reassign control by the master controller of a first instrument to a second instrument by. The teleoperational robotic system also includes detecting activation of an instrument reassignment input. The teleoperational robotic system also includes computing, by the control system, proxy positions of at least a first instrument and a second instrument of the plurality of instruments. The teleoperational robotic system also includes computing a proxy position of the master controller. The teleoperational robotic system also includes receiving input from the master controller associating the proxy position of the master controller with the proxy position of the second instrument. The teleoperational robotic system also includes assigning control of the second instrument to the master controller based on the association between the proxy position of the master controller with the proxy position of the second instrument.

One general aspect includes a tangible, non-transitory computer-readable medium storing instructions that, when executed by a processing device of a teleoperational robotic system controller, cause the processing device to perform operations including: detecting activation of an instrument reassignment input; computing proxy positions of at least a first instrument and a second instrument of a plurality of teleoperational medical instruments; computing a proxy position of the master controller; receiving input from a master controller in communication with the teleoperational robotic system controller, the input associating the proxy position of the master controller with the proxy position of the second instrument; and assigning, by the control system, control of the second instrument to the master controller based on the association between the proxy position of the master controller with the proxy position of the second instrument.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTIONS OF THE DRAWINGS

Figure 1:
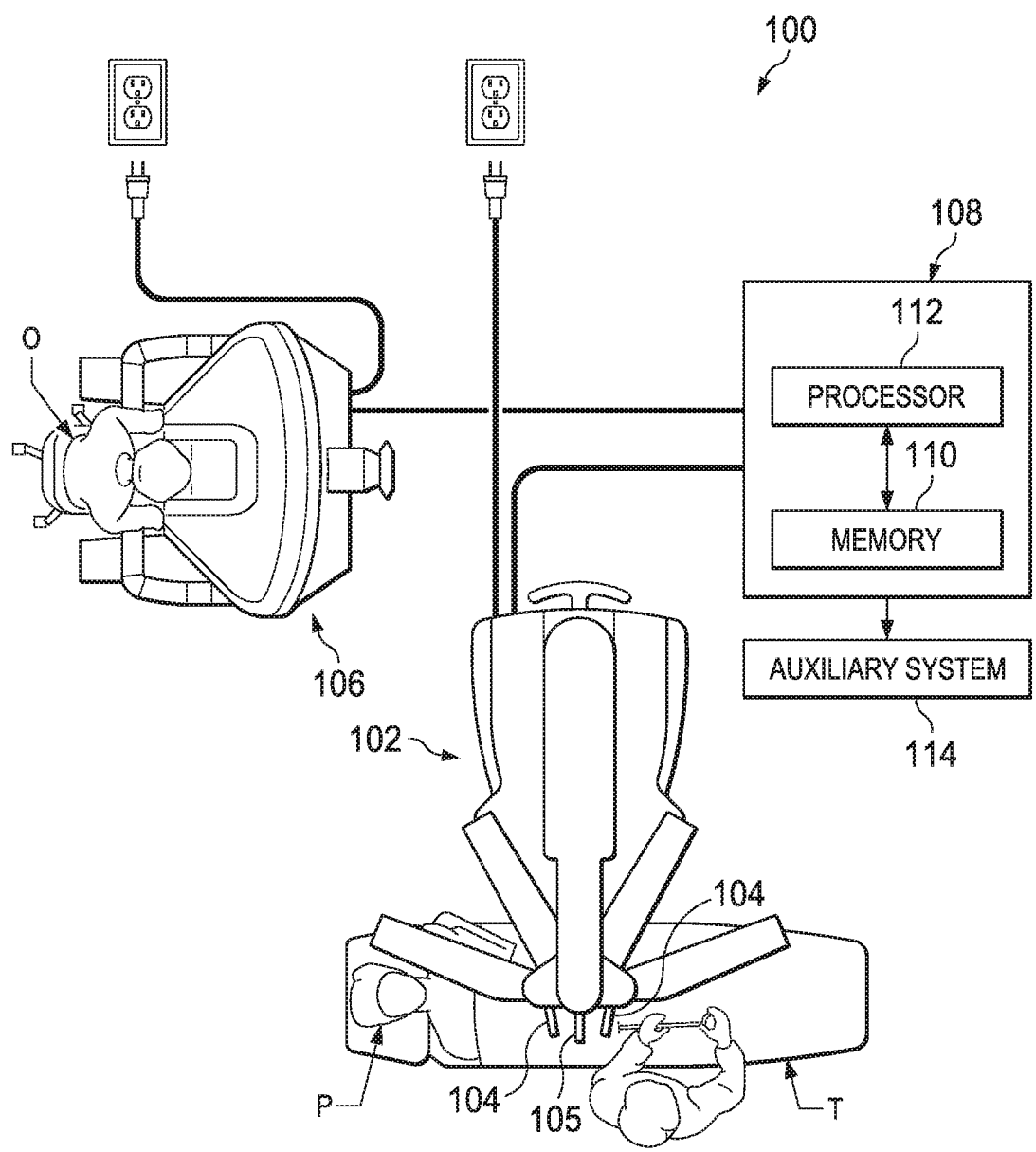
FIG. 1 is a schematic depiction of a teleoperational medical system, according to an embodiment of the present disclosure.

FIGS. 6A, 6B, 6C, and 6D are images corresponding to an operator's view of an interventional site in a display of the teleoperational medical system of FIG. 1 during an instrument control swap, according to an embodiment of the present disclosure.

FIGS. 7A, 7B, 7C, and 7D are illustrations of the hands of the operator of the teleoperational medical system of FIG. 1, which correspond to FIGS. 6A, 6B, 6C, and 6D, respectively, according to an embodiment of the present disclosure.

Figure 8A:
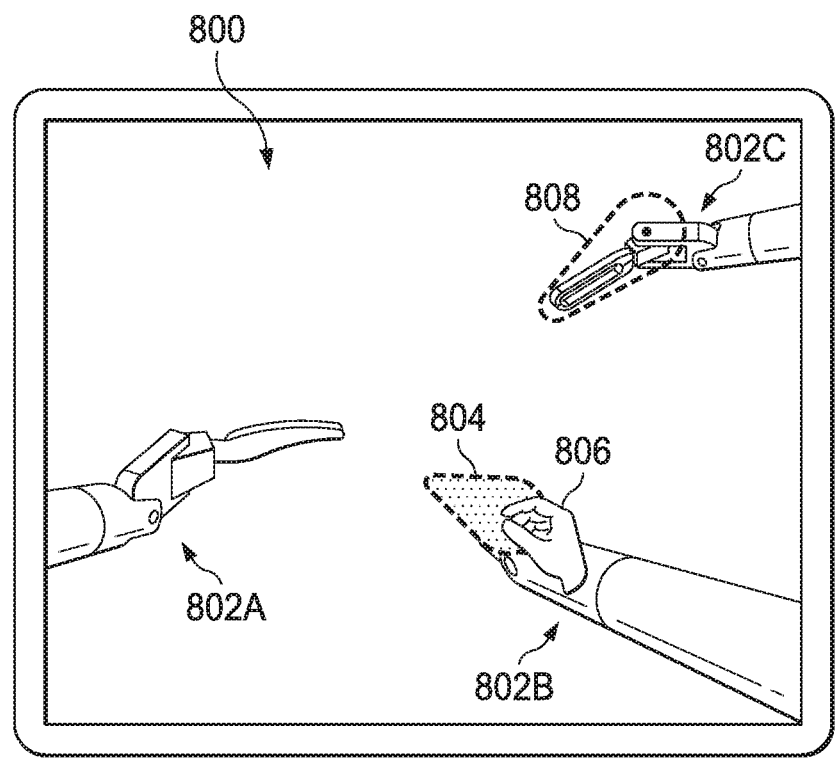
Figure 8B:
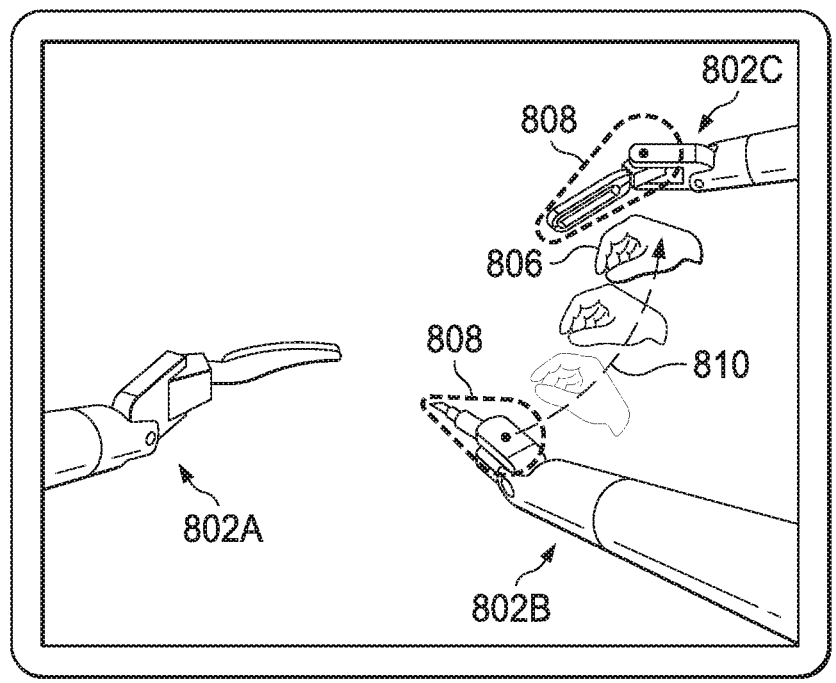
Figure 8C:
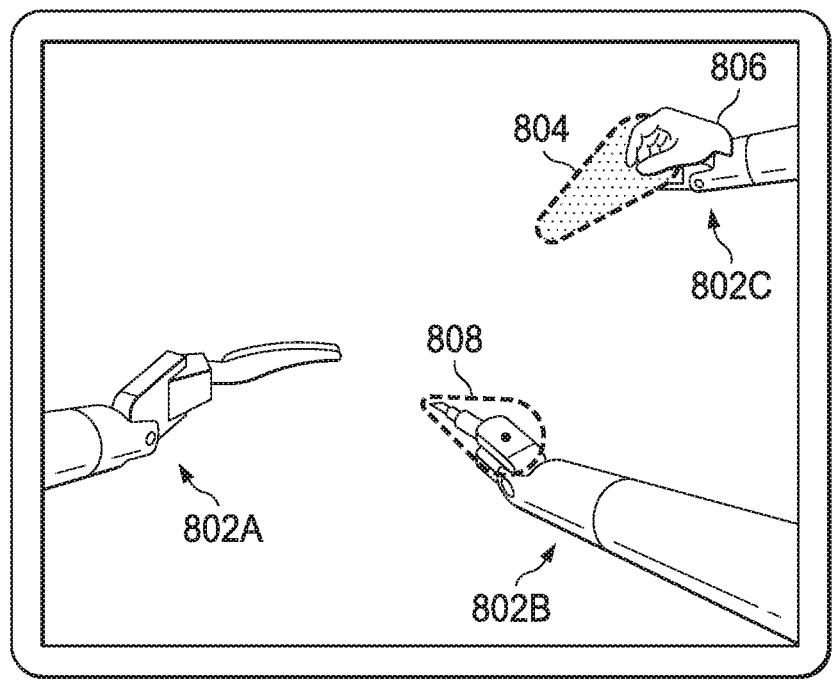

FIGS. 8A, 8B, and 8C are images corresponding to an operator's view of an interventional site in a display of the teleoperational medical system of FIG. 1 during an instrument control swap, according to another embodiment of the present disclosure.

Figure 9A:
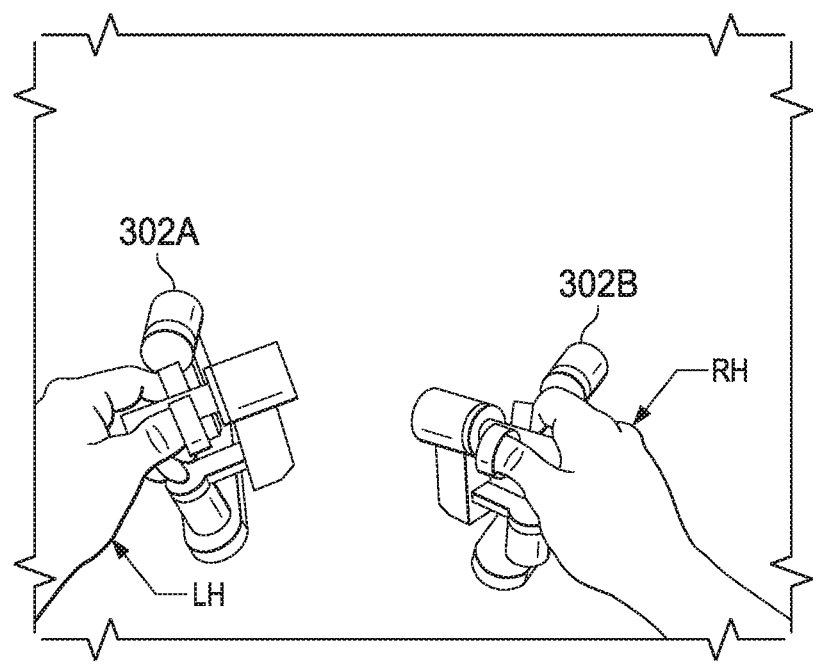
Figure 9B:
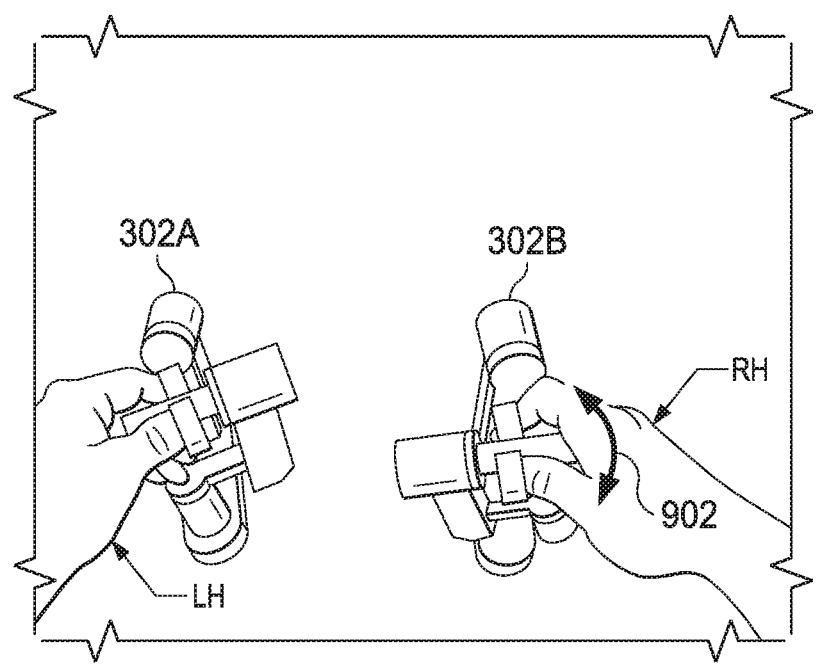
Figure 9C:
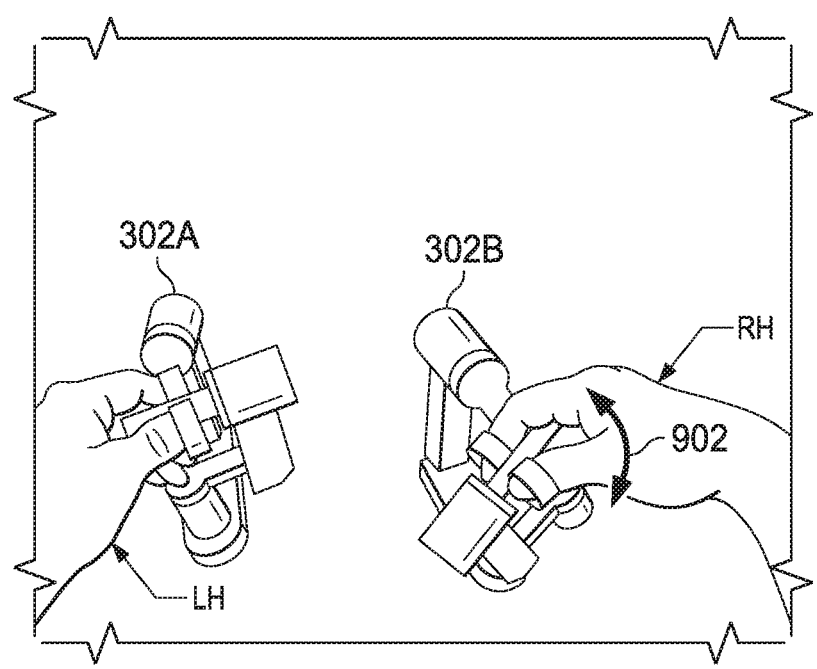

FIGS. 9A, 9B, and 9C are illustrations of the hands of the operator of the teleoperational medical system of FIG. 1, which correspond to FIGS. 8A, 8B, and 8C, respectively, according to another embodiment of the present disclosure.

Figure 10A:
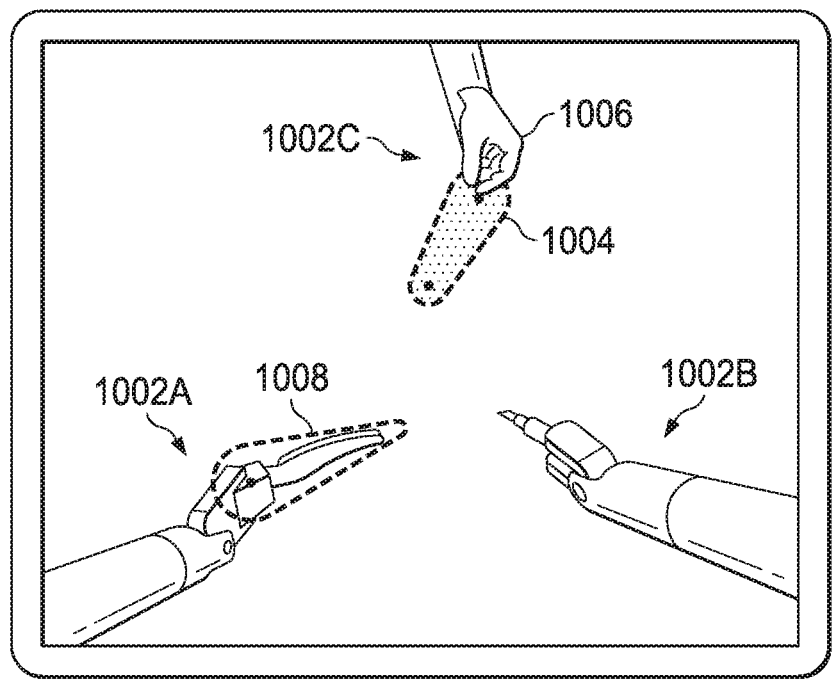
Figure 10B:
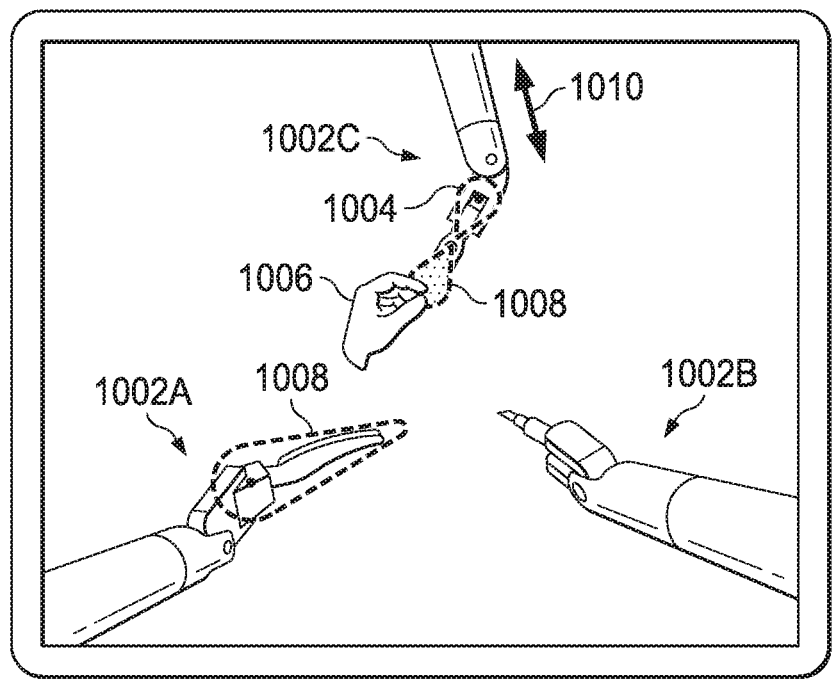

FIGS. 10A and 10B are images corresponding to an operator's view of an interventional site in a display of the teleoperational medical system of FIG. 1 during an instrument control swap, according to another embodiment of the present disclosure.

Figure 11A:
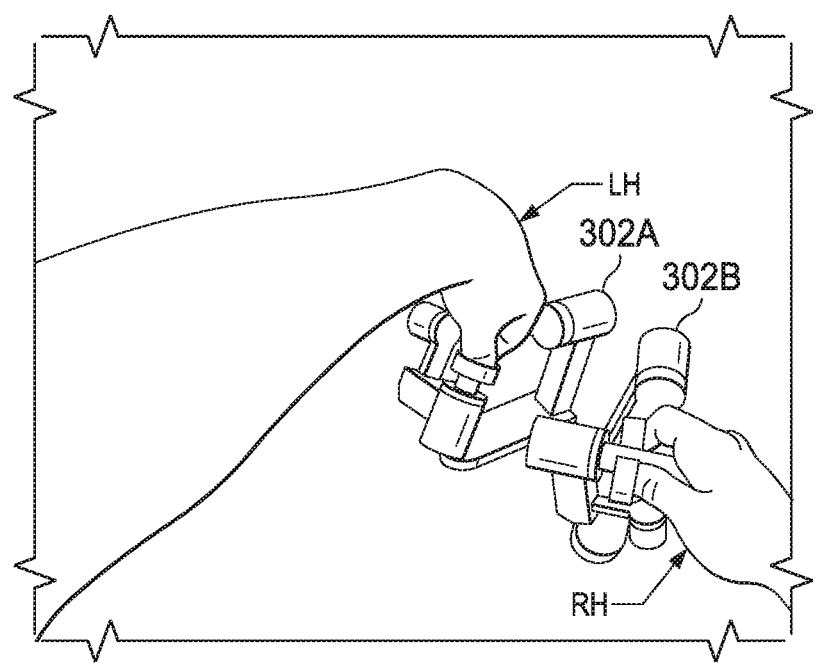
Figure 11B:
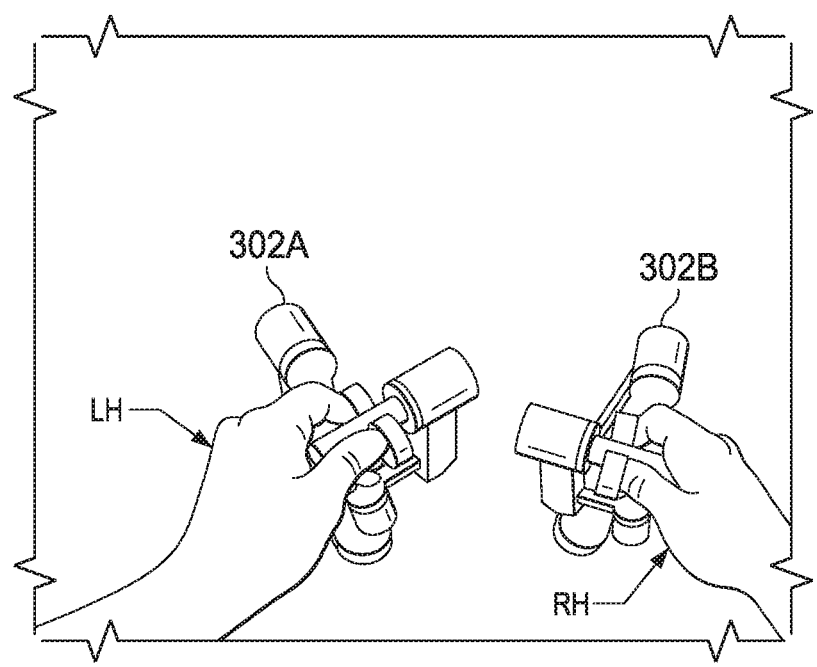

FIGS. 11A and 11B are illustrations of the hands of the operator of the teleoperational medical system of FIG. 1, which correspond to FIGS. 10A and 10B, respectively, according to another embodiment of the present disclosure.

Figure 12:
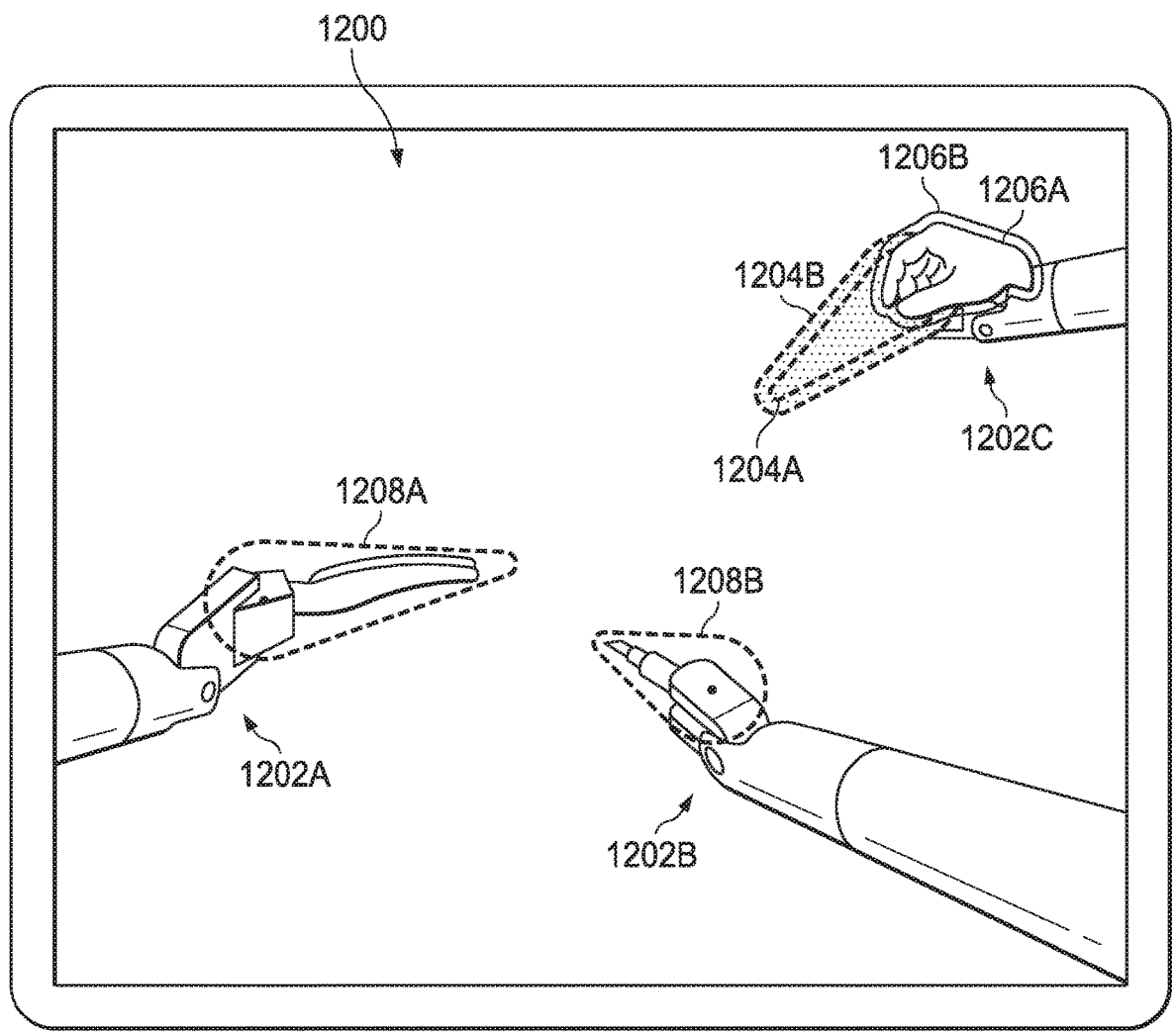

FIG. 12 depicts a view that may be shown in the display systems of at least two consoles in a shared control implementation, according to another embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In the following description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In the following detailed description of the embodiments of the invention, numerous specific details are set forth in order to provide a thorough understanding of the disclosed embodiments. However, it will be obvious to one skilled in the art that the embodiments of this disclosure may be practiced without these specific details. In other instances well known methods, procedures, components, and circuits have not been described in detail so as not to unnecessarily obscure aspects of the embodiments of the invention. Generally, embodiments of the present disclosure may improve existing teleoperational medical systems or improve the performance of such systems by providing better means to switch control assignments during a procedure.

In conventional teleoperational medical systems, switching the assignment of a controller from one instrument to another may entail multiple difficulties. For example, such a swap may be performed between instruments that are not in the physician's view. Or forcing the physician's hand to the position associated with the new instrument may be cause the physician to be surprised or to put his or her hands into uncomfortable and awkward positions that are difficult to operate in. Embodiments of the present disclosure may permit a physician to reassign control by virtually "grasping" or otherwise interacting with the instrument that the physician wants to control. Visual and haptic cues may be provided as well. Embodiments of the present disclosure may overcome existing difficulties encountered by physicians when swapping instruments during a minimally-invasive, teleoperational procedure, as described below.

Referring to FIG. 1 of the drawings, a teleoperational system 100 for use in, for example, medical procedures including diagnostic, therapeutic, or surgical procedures is depicted. The teleoperational system 100 is described in the context of medical applications and so may be referred to herein as a teleoperational medical system 100. As described herein, the teleoperational medical systems of this disclosure are under the teleoperational control of an operator (e.g., a surgeon, a clinician, a physician, etc.). In alternative embodiments, a teleoperational medical system may be under the partial control of a computer programmed to perform the procedure or sub-procedure. In still other alternative embodiments, a fully automated medical system, under the full control of a computer programmed to perform the procedure or sub-procedure, may be used to perform procedures or sub-procedures. One example of such a teleoperational medical system that can be used to implement the systems and techniques described in this disclosure is a da Vinci® Surgical System manufactured by Intuitive Surgical, Inc. of Sunnyvale, California.

While some embodiments provided herein are discussed primarily with respect to medical procedures, any reference to medical or surgical instruments and medical or surgical methods is non-limiting. The systems, instruments, and methods described herein may be used for animals, human cadavers, animal cadavers, human or animal tissue removed from human or animal anatomy and not to be returned to such human or animal anatomy, non-surgical treatment, diagnosis, or cosmetic improvements. The systems, instruments, and methods described herein may also be used for industrial systems and general robotic or teleoperational systems, including those for manipulating or otherwise interacting with work pieces not comprising human or animal tissue.

As shown in FIG. 1, the teleoperational medical system 100 generally includes a teleoperational assembly 102 mounted to or near an operating table T on which a patient P is positioned. The teleoperational assembly 102 may be referred to as a patient side cart. A medical instrument system 104 and an endoscopic imaging system 105 are operably coupled to the teleoperational assembly 102. An operator input system or console 106 allows a surgeon or other type of physician O to view images of or representing the surgical site and to control the operation of the medical instrument system 104 and/or the endoscopic imaging system 105.

The console 106 may be located at a surgeon's console, which is usually located in the same room as operating table T. It should be understood, however, that the physician O can be located in a different room or a completely different building from the patient P. In various embodiments, a teleoperational medical system may include more than one console 106 and surgeon's console. In various embodiments, an operator input system may be available on a mobile communication device including a tablet or a laptop computer. The console 106 generally includes one or more control device(s) for controlling the medical instrument system 104. The control device(s) may include one or more of any number of a variety of input devices, such as hand grips, joysticks, trackballs, data gloves, trigger-guns, foot pedals, hand-operated controllers, voice recognition devices, touch screens, body motion or presence sensors, and the like. In some embodiments, the control device(s) will be provided with the same degrees of freedom as the medical instruments of the teleoperational assembly to provide the physician with telepresence, the perception that the control device(s) are integral with the instruments so that the physician has a strong sense of directly controlling instruments as if present at the surgical site. In other embodiments, the control device(s) may have more or fewer degrees of freedom than the associated medical instruments and still provide the physician with telepresence. In some embodiments, the control device(s) are manual input devices which move with six degrees of freedom, and which may also include an actuatable handle for actuating instruments (for example, for closing grasping jaw end effectors, applying an electrical potential to an electrode, delivering a medicinal treatment, and the like).

The teleoperational assembly 102 supports and manipulates the medical instrument system 104 while the physician S views the surgical site through the console 106. An image of the surgical site can be obtained by the endoscopic imaging system 105, such as a stereoscopic endoscope, which can be manipulated by the teleoperational assembly 102 to orient the endoscopic imaging system 105. A control system 108 can be used to process the images of the surgical site for subsequent display to the physician S through the physician's console 106. The number of medical instrument systems 14 used at one time will generally depend on the diagnostic or surgical procedure and the space constraints within the operating room among other factors. The teleoperational assembly 102 may include a kinematic structure of one or more non-servo controlled links (e.g., one or more links that may be manually positioned and locked in place, generally referred to as a set-up structure) and a teleoperational manipulator. The teleoperational assembly 102 includes a plurality of motors that drive inputs on the medical instrument system 104. These motors move in response to commands from the control system (e.g., control system 108). The motors include drive systems which when coupled to the medical instrument system 104 may advance the medical instrument into a naturally or surgically created anatomical orifice. Other motorized drive systems may move the distal end of the medical instrument in multiple degrees of freedom, which may include three degrees of linear motion (e.g., linear motion along the X, Y, Z Cartesian axes) and in three degrees of rotational motion (e.g., rotation about the X, Y, Z Cartesian axes). Additionally, the motors can be used to actuate an articulable end effector of the instrument for grasping tissue in the jaws of a biopsy device or the like. Instruments 14 may include end effectors having a single working member such as a scalpel, a blunt blade, an optical fiber, or an electrode. Other end effectors may include, for example, forceps, graspers, scissors, or clip appliers.

The teleoperational medical system 100 also includes a control system 108. The control system 108 includes at least one memory 110 and at least one processor 112, and typically a plurality of processors, for effecting control between the medical instrument system 104, the console 106, and other auxiliary systems 114 which may include, for example, imaging systems, audio systems (including an intercom system), fluid delivery systems, display systems, mobile vision carts, illumination systems, steering control systems, irrigation systems, and/or suction systems. The control system 108 also includes programmed instructions (e.g., a computer-readable medium storing the instructions) to implement some or all of the methods described in accordance with aspects disclosed herein. While control system 108 is shown as a single block in the simplified schematic of FIG. 1A, the system may include two or more data processing circuits with one portion of the processing optionally being performed on or adjacent the teleoperational assembly 102, another portion of the processing being performed at the console 106, and the like. Any of a wide variety of centralized or distributed data processing architectures may be employed. Similarly, the programmed instructions may be implemented as a number of separate programs or subroutines, or they may be integrated into a number of other aspects of the teleoperational systems described herein. In one embodiment, control system 108 supports wireless communication protocols such as Bluetooth, IrDA, HomeRF, IEEE 802.11, DECT, and Wireless Telemetry.

In some embodiments, control system 108 may include one or more servo controllers that receive force and/or torque feedback from the medical instrument system 104. Responsive to the feedback, the servo controllers transmit signals to the console 106. The servo controller(s) may also transmit signals instructing teleoperational assembly 102 to move the medical instrument system(s) 104 and/or endoscopic imaging system 105 which extend into an internal surgical site within the patient body via openings in the body. Any suitable conventional or specialized servo controller may be used. A servo controller may be separate from, or integrated with, teleoperational assembly 102. In some embodiments, the servo controller and teleoperational assembly are provided as part of a teleoperational arm cart positioned adjacent to the patient's body.

The control system 108 can be coupled with the endoscope 105 and can include a processor to process captured images for subsequent display, such as to a physician on the physician's console, or on another suitable display located locally and/or remotely. For example, where a stereoscopic endoscope is used, the control system 108 can process the captured images to present the physician with coordinated stereo images of the surgical site. Such coordination can include alignment between the opposing images and can include adjusting the stereo working distance of the stereoscopic endoscope.

In alternative embodiments, the teleoperational system may include more than one teleoperational assembly and/or more than one operator input system. The exact number of manipulator assemblies will depend on the surgical procedure and the space constraints within the operating room, among other factors. The operator input systems may be collocated or they may be positioned in separate locations. Multiple operator input systems allow more than one operator to control one or more manipulator assemblies in various combinations.

Figure 2:
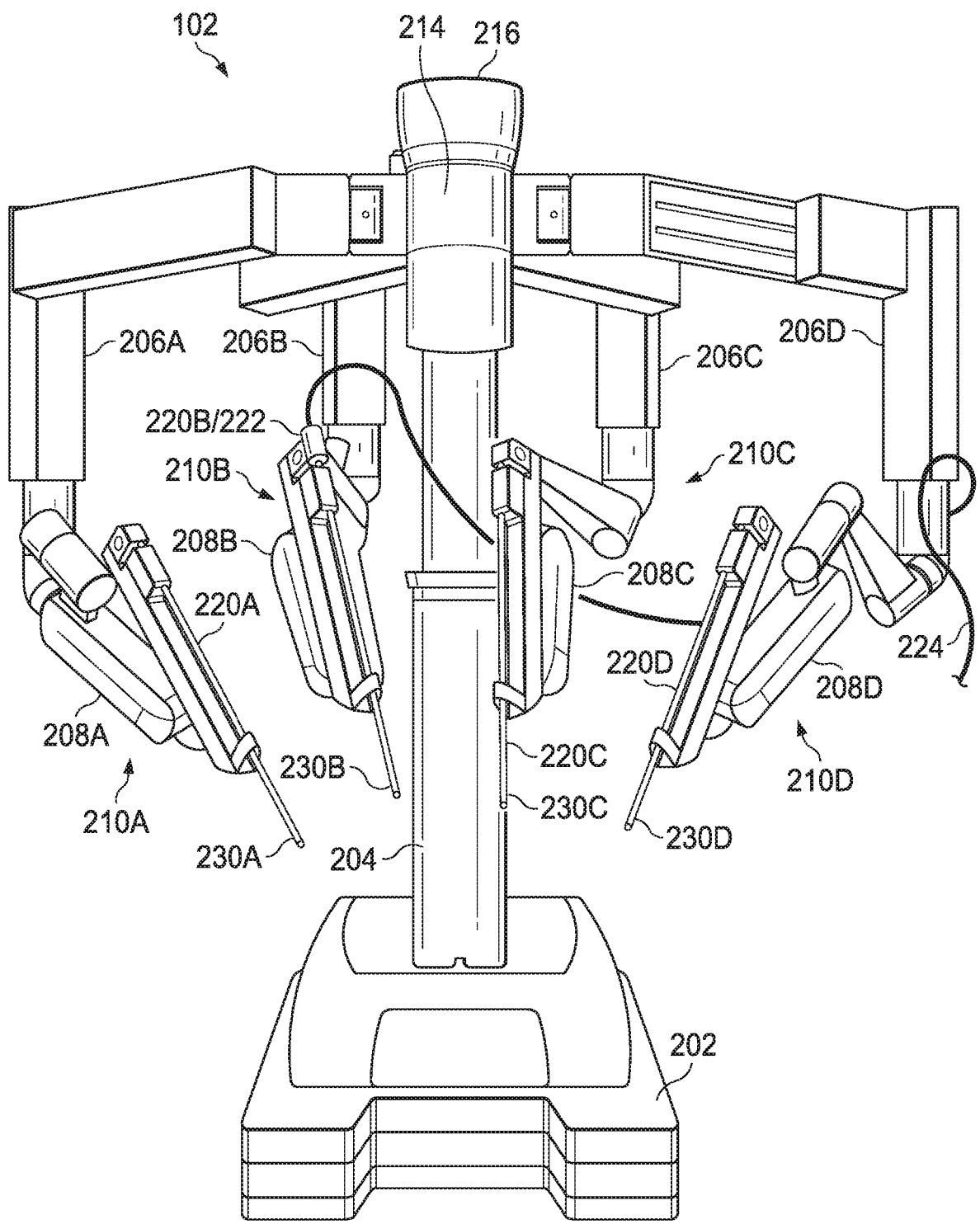
FIG. 2 is a front elevation view of the teleoperational assembly including four patient side arms and one endoscopic arm, according to an embodiment of the disclosure.

FIG. 2 is a perspective view of one embodiment of a teleoperational assembly 102 which may be referred to as a patient side cart. The assembly 102 includes a drivable base 202. The drivable base 202 is connected to a telescoping column 204, which allows for adjustment of the height of a collection of arms, including coupling arms 206A, 206B, 206C, and 206D (collectively or generically coupling arm(s) 206). More or fewer coupling arms 206 may be included in various embodiments. Each of the coupling arms 206 may include one or more rotating joints 212 that both rotates and moves up and down. Each of the coupling arms 206 may be connected to an orienting platform 214. The orienting platform 214 may be capable of 360 degrees of rotation. The assembly 102 may also include a telescoping horizontal cantilever 216 for moving the orienting platform 214, and thereby the coupling arms 206, in a horizontal direction.

In the present example, each of the coupling arms 206 connects to a manipulator arm 208, such that FIG. 2 depicts manipulator arms 208A, 208B, 208C, and 208D (collectively or generically referred to as manipulator arm(s) 208). The manipulator arms 208 may connect directly to a medical instrument 220. The manipulator arms 208 may be teleoperational and may include multiple joints to allow for the positioning and repositioning of the arms 208 and attached instruments by the physician O. In some examples, the coupling arms 206 connecting to the orienting platform 214 are not teleoperational. Rather, such coupling arms 206 are positioned as desired before the physician O begins operation with the teleoperative components.

In this disclosure, each coupling arm/manipulator arm pair may be referred to as a robotic arm 210 or, simply, an arm 210, such that the robotic arm 210A includes the coupling arm 206A and the manipulator arm 210B. As depicted in FIG. 2, the assembly 102 provides for the manipulation of medical instruments 220A, 220B, 220C, and 220D, which are detachably disposed on the robotic arms 210A, 210B, 210C, and 210D, respectively. As depicted, the instrument 220B may be an imaging device or endoscope 222, like the endoscopic image system 105 of FIG. 1. The instruments 220A, 220C, and 220D may be other instruments systems, like the instrument systems 104 of FIG. 1. The endoscope 222 may be a stereoscopic endoscope used for the capture of images of the site of the procedure. The endoscope 222 may transmit signals over a cable 224 to the control system 108. The endoscope 222 and the medical instruments 220 can be positioned and manipulated through incisions in the patient so that a kinematic remote center is maintained at the incision to minimize the size of the incision. Images of the surgical site can include images of the distal ends of the medical instruments 220 when they are positioned within the field-of-view of the endoscope 222.

Endoscopic imaging systems (e.g., systems 105, 222) may be provided in a variety of configurations including rigid or flexible endoscopes. Rigid endoscopes include a rigid tube housing a relay lens system for transmitting an image from a distal end to a proximal end of the endoscope. Flexible endoscopes transmit images using one or more flexible optical fibers. Digital image based endoscopes have a "chip on the tip" design in which a distal digital sensor such as a one or more charge-coupled device (CCD) or a complementary metal oxide semiconductor (CMOS) device store image data. Endoscopic imaging systems may provide two- or three-dimensional images to the viewer. Two-dimensional images may provide limited depth perception. Three-dimensional stereo endoscopic images may provide the viewer with more accurate depth perception. Stereo endoscopic instruments employ stereo cameras to capture stereo images of the patient anatomy. An endoscopic instrument may be a fully sterilizable assembly with the endoscope cable, handle and shaft all rigidly coupled and hermetically sealed.

During operation of the teleoperational medical system 100, one or more of the medical instruments 220 may be replaced by other medical instruments 220 or the medical instruments 220 may be moved among the manipulator arms 208. For example, the endoscope 222 may be detached from the manipulator arm 208B and attached to the arm 208C or 208D. The control system 108 may identify the type of medical instrument 220 attached to each of the manipulator arms 208. The control system 108 may receive kinematic chain information from encoders and/or angle, position, shape sensors to model or determine the configuration of the arms 210 and the instruments 220 within a three-dimensional space defining a patient reference frame. In some embodiment, machine vision may be employed such that the positions and orientations of the medical instruments 220 that are visible to the endoscope 222 can be extracted from the images obtained by the endoscope. The positions and orientations may be registered to a larger frame by using kinematic chain information associated with the endoscope 222. Accordingly, the location and orientation of the arms 210 and the medical instruments 220 may be utilized by the control system 108 in performing some of its control functions with respect to the assembly 102 and the console 106. The system 108 may also know tip transforms of each of the instruments 220A, 220C, and 220D with respect to the tip of the endoscope 222 and viewing coordinates associated with the tip of the endoscope 222. Such information may be used by the control system 108 when superimposing visual indicators and/or provide haptic cues when the physician O needs to reassign control of one of the instruments 220 during a procedure, as described in this disclosure.

Knowledgeable persons will appreciate that the arms that support the instruments and the camera may also be supported by a base platform (fixed or moveable) mounted to a ceiling or wall, or in some instances to another piece of equipment in the operating room (e.g., the operating table T). Likewise, they will appreciate that two or more separate bases may be used (e.g., one base supporting each arm). Embodiments of the medical instruments 220 may each include shafts having end effectors 230A, 230B, 230C, and 230E, respectively, disposed distally on the shafts. In various embodiments, effectors 230 may include clamps, suction/irrigation catheters, illumination probes, ablation probes, cannulas, needles, forceps, etc., to enable the operating physician to perform a variety of diagnostic and surgical procedures.

Figure 3:
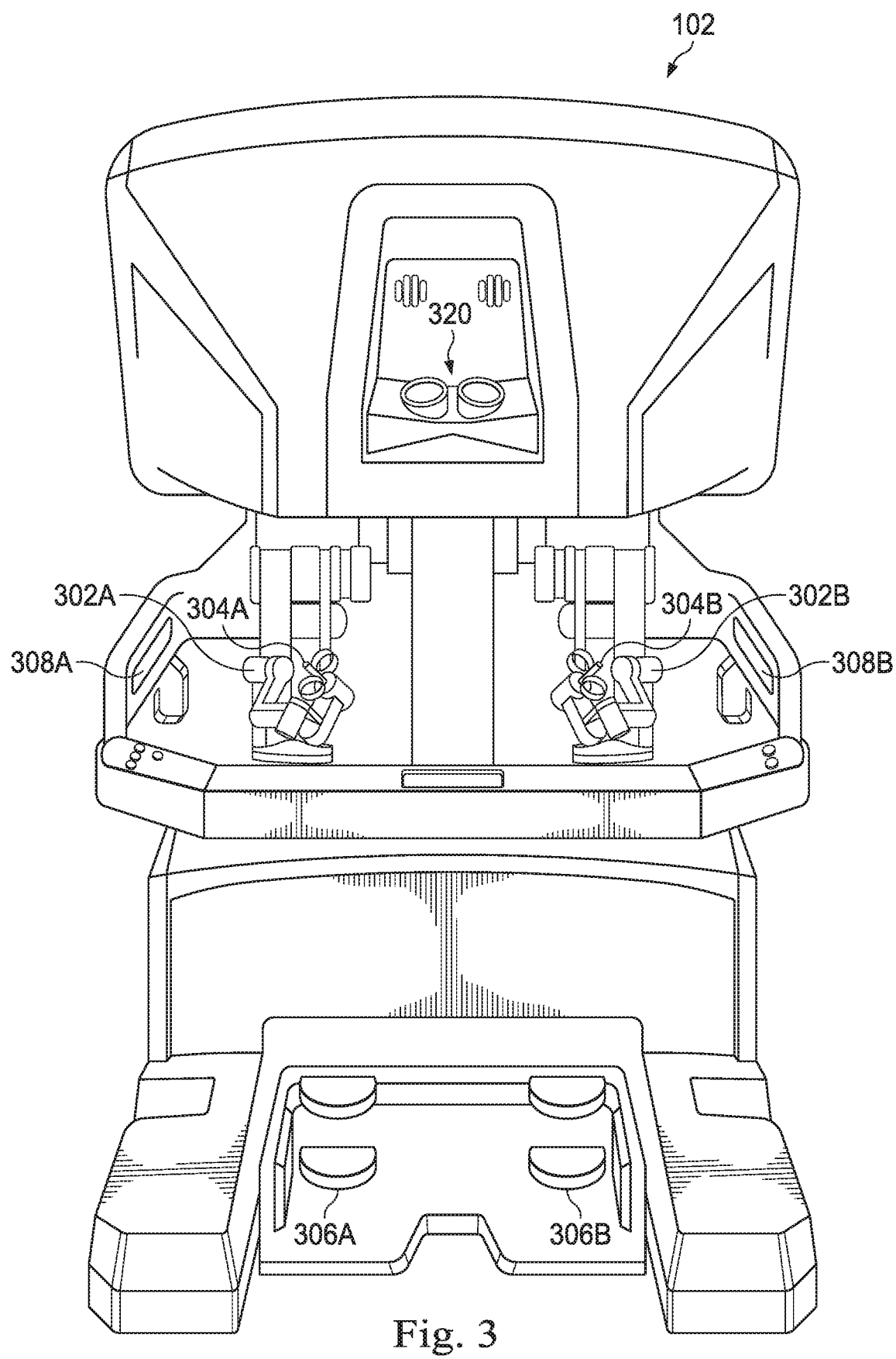
FIG. 3 is a front elevation view of an operator's console in a teleoperational medical system, according to an embodiment of the disclosure.

FIG. 3 is a front elevation view of a master console 106 component according to one embodiment of the teleoperational medical system 100 of FIG. 1. The master console 106 is equipped with left and right multiple degree-of-freedom (DOF) master controllers 302, also referred to as master tool manipulators (MTMs). The depicted master controllers 302A and 302B may include kinematic chains that are used to control the medical tools (which include the endoscope and various cannulas). The master controllers 302 may be referred to simply as "manipulators," and their associated arms 210 and medical instruments 220 may be referred to simply as "slave." In the depicted embodiment, the physician grasps a pincher assembly 304A or 304B on each master controller 302, typically with the thumb and forefinger, and can move the pincher assembly 304 to various positions and orientations. Each master controller 302 generally allows for movement within the master workspace with a plurality of degrees of freedom, typically with six degrees of freedom, three rotational degrees of freedom and three translational degrees of freedom. An embodiment of the master controllers 302 is shown in greater detail in FIG. 4. The physician's console 106 is typically located in the same operating room as the patient-side assembly 102, although it is generally positioned so that the physician operating the console is outside the sterile field. One or more assistants typically assist the physician by working within the sterile operational field (e.g., to change tools or instruments on the patient-side assembly 102, to perform manual retraction, etc.). Accordingly, the physician operates remotely from the sterile field, and so the console may be located in a separate room or building from the operating room. In some implementations, two consoles 106 (either co-located or remote from one another) may be networked together so that two physicians can simultaneously view and control tools at the interventional site.

When an instrument control mode is selected, each master controller 302 is coupled to control a corresponding robotic arm 210 of the patient-side assembly 102. For example, the left master controller 302A may be coupled to control robotic arm 210A and/or its associated instrument 220A, and the right master controller 302B may be coupled to control arm 210D and its corresponding instrument 220D. In some instances, control of the arm 210 may be performed in an arm control mode, while control of the instrument 220 may be performed in a distinct instrument control mode. If the robotic arm 210B is used during a medical procedure and is positioned on the left side, then the physician may desire to reassign the left master controller 302A from controlling arm 210A and instrument 220A to controlling arm 210B and instrument 220B, instead. Likewise, if the robotic arm 210E is to be used during a medical procedure and is positioned on the right side, then right master controller 302B can be switched between controlling arm 210D and instrument 220D to controlling arm 210E and instrument 220E. In alternative embodiments, any of the instrument arms may be controlled by either the left or right master controller to accommodate the physician's preference, the view available to the physician, or the requirements of a particular procedure. In some instances, control assignments between master controllers 302A and 302B and arm 210A/instrument 220A combination and arm 210B/instrument 220B combination may also be exchanged. This may be done, for example, if the endoscope 222 is rolled 180 degrees, so that the instrument moving in the endoscope's field of view appears to be on the same side as the master controller the physician is moving. Embodiments of the present disclosure facilitate switching between the control of the various arms 210/instruments 220 by the master controllers 302.

The console 106 may include additional input devices, including one or more foot pedals, like the exemplary foot pedals 306A and 306B. The foot pedals may include left and right foot pedals and may vary in number in different embodiments. As depicted, the console 106 includes six foot pedals 306. However, other embodiments may include only one or two foot pedals. The console 106 may further include elbow switches or pads 308A and 308B. The elbow pads 308 may permit the physician to activate a feature, by pushing against a pad 308 with either the corresponding elbow. Some embodiments include pads disposed for activation by the physician's knees. For example, the console 106 may include a left kneepad and right kneepad, which may operate as buttons or switches when activated by the physician.

Physician's console 106 also includes a stereoscopic image display system 320. Left side and right side images captured by the stereoscopic endoscope 222 are output on corresponding left and right displays, which the physician perceives as a three-dimensional image on display system 320. In one configuration, the master controllers 302 are positioned below display system 320 so that the images of the medical tools shown in the display appear to be co-located with the physician's hands below the display. This feature allows the physician to intuitively control the various medical tools shown in the three-dimensional display system 320 as if watching the hands directly. Accordingly, control of the associated instrument arm and instrument, by a master controller 302, may be based on the endoscopic image reference frame. In other words, the control system may register the instruments 220 and arms 210s to the endoscopic image reference frame based on kinematic information characterizing the positioning of the arms 210 and instruments 220, including the endoscope 222.

The endoscopic image reference frame is also used if the master controllers are switched to a camera control mode. For example, if the camera control mode is selected, the physician may move the distal end of the endoscope by moving one or both of the master controllers together (portions of the two master controllers may be servomechanically coupled so that the two master controller portions appear to move together as a unit). The physician may then intuitively move (e.g., pan, tilt, zoom) the displayed stereoscopic image by moving the master controllers as if holding the image in the hands.

Figure 4:
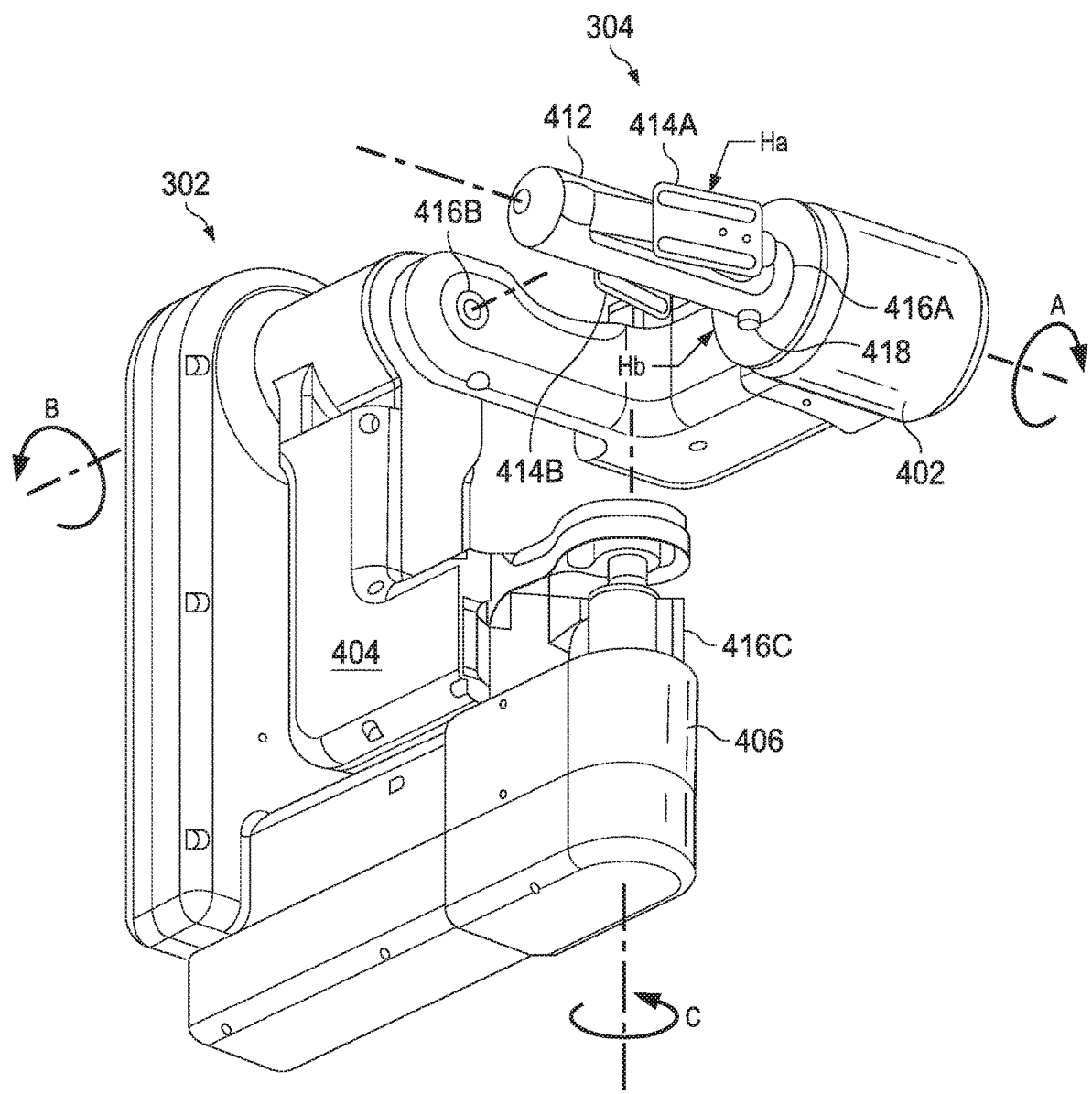
FIG. 4 is a perspective view of an exemplary gimbaled device of the physician's console of FIG. 3 to control one or more arms of the patient side cart of FIG. 2, according to an embodiment of the disclosure.

Referring now to FIG. 4, shown therein is a perspective view of an embodiment of one of the master controllers 302 with a finger assembly 304. Embodiments of the master controller 302 as shown in FIG. 4 may provide the master controllers 302A and 302B, which may be mirrored versions of each other to provide left and right hand controls. The master controller 302 is a gimbaled device that pivotally supports the assembly 304, which may include a touch sensitive handle to generate control signals that are used to control the assembly 102 and the robotic medical tools, such as the end effectors 230 of FIG. 2. As shown in FIG. 3, a pair of master controllers 302 may be supported by a pair of control input arms in the workspace defined by the master control console 106.

The depicted master controller 302 includes first, second, and third gimbal members 402, 404, and 406. The touch sensitive handle provided by finger assembly 304 includes a tubular support structure 412, a first grip 414A, and a second grip 414B. The first grip 414A and the second grip 414B are supported at one end by the structure 412. In some embodiments, the grips 414 may include loops of material that help secure the physician's fingers in place relative to the structure of the grips. Additionally, some embodiments may include more than two grips connected to the support structure 412 or two grips 414 and another control mechanism, like a button, switch, track pad, or scroll-wheel. For example, the master controller 302 may include a button 418 that may be activated by the physician to switch control modes or perform a particular action. As shown, the button 418 is mounted at a proximal end of the support structure 412, disposed between the grips 414, such that it can be actuated when a hand grips the support structure 412. The button 418 may include a redundant button or a similar but non-redundant button disposed on the opposite side of the support structure 412. However, one or more similar buttons may be positioned elsewhere in other embodiments. The finger assembly 304 can be rotated about axis A, illustrated in FIG. 4. The grips 414A and 414B can be squeezed or pinched together about the tubular structure 412. The "pinching" or grasping degree of freedom in the grips is indicated by arrows Ha and Hb. These or other movements of the grips 414 relative to the support structure 412 may provide commands to manipulate the end effectors 230 of instruments 220.

The finger assembly 304 is rotatably supported by the first gimbal member 402 by means of a rotational joint 416A. The first gimbal member 402 is in turn, rotatably supported about axis B by the second gimbal member 404 by means of the rotational joint 416B. Similarly, the second gimbal member 404 is rotatably supported about axis C by the third gimbal member 406 using a rotational joint 416C. In this manner, the master controller 302 allows the finger assembly 304 to be moved and oriented in the workspace using three degrees of freedom.

The movements in the gimbals of the master controller 302 to reorient the finger assembly 304 in space can be translated into control signals to control an arm 210/instrument 220 combination. For example, the rotational motion of the finger assembly 304 about axis A in FIG. 4 may be used to roll instrument 220 about its shaft axis. Alternatively or additionally, the squeezing motion of the grips 414A, 414B over their freedom of movement indicated by arrows Ha and Hb, may be used to command a grasping motion with forceps, or a cutting motion with scissors, or control the flow of fluids through the suction/irrigator robotic medical tool positioned at the interventional site, for example. The grips 414 may be passively biased to spring open, providing a restoring force to release forceps, open scissors, etc.

To sense the movements in the touch sensitive handle and generate controls signals for the instruments 220, sensors can be mounted in the finger assembly 304 as well as the gimbal members of the master controller 302. Exemplary sensors may include a Hall effect transducer, a potentiometer, an encoder, or the like.

As described below in more detail, some procedures may require more instruments at the interventional site than the operator has hands or than the master console 106 has master controllers 302. Additionally, as in shown in FIG. 2, some embodiments of the assembly 102 may include five instruments 220, while the console 106 only includes two master controllers 302. Accordingly, when the operator wants to switch assignment of one of the master controllers, there are potentially three instruments 220 that the physician may want to control. Care should be taken to ensure that the right instrument 220 is selected from the three unassigned instruments when the physician wants to reassign control. As described herein, the console 106 includes features that permit the operator to change the control assignment between arms 210/instruments 220 and master controllers 302, such that a particular master controller can be reassigned from controlling the instrument 220A to controlling the instrument 220B, for example, as the operator deems necessary. In this way, a single operator may more effectively utilize more arms/instruments.

Figure 5:
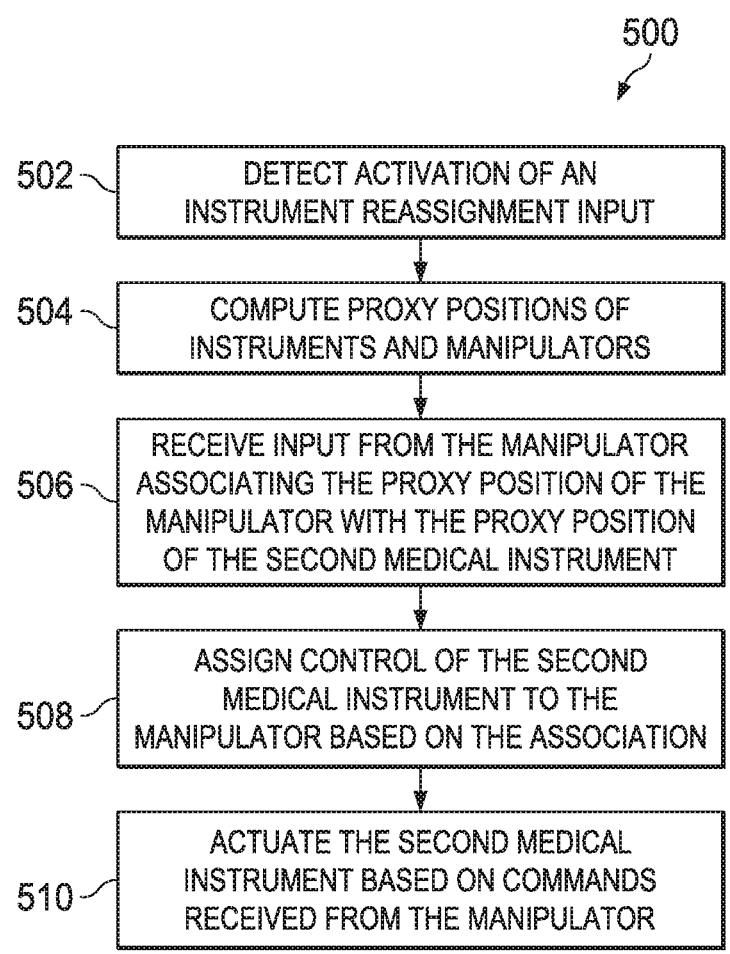
FIG. 5 is a flow chart of a method for reassign control of an instrument by a manipulator like that of FIG. 4, according to an embodiment of the disclosure.

Referring now to FIG. 5, shown therein is a flowchart of a method 500 for swapping or reassigning control, by a single master controller 302, among multiple instruments 220/arms 210. The method 500 is depicted as a series of enumerated steps or operations. Embodiments of the method 500 may include additional or alternative operations beyond those enumerated in FIG. 5. Accordingly, other operations may be included before, after, in between, or as part of the enumerated operations. Additionally, some embodiments of the method 500 include computer readable instructions or code that, when executed by a processing device, causes a system, such as the teleoperated medical system 100 or the control system 108 of FIG. 1, to perform the operations.

Some embodiments of the method 500 may begin at an operation 502, when a processing device detects activation of an instrument reassignment input mechanism. For example, the physician may activate one of the elbow pads 308 with the physician's elbow, one of the foot pedals 306 by the physician's foot, a kneepad, or one of the buttons 418 to cause the control system 108 of FIG. 1 to enter an instrument reassignment state. The instrument reassignment state may cause the control system 108 to monitor movement of the master controllers 302 without causing those movements to be effected in any of the instruments 220. In some embodiments, the detection may be detection of a pressing and holding of such a reassignment input, such that the instrument reassignment state is only ongoing while the input mechanism is held in an activated state. In other embodiments, the reassignment input may not need to be held in a particular position to maintain an activated state. The particular foot pedal, elbow pad, kneepad, or button may correspond in left- or right-handedness to either the master controller 302A or the master controller 302B to identify which master controller 302 is to be reassigned. Alternatively, the instrument reassignment input may be received, and the first master controller 302 to be detected by the control system 108 as being moved by the physician is determined to be the master controller 302 to be reassigned. Additionally, some embodiments may allow both of the master controllers 302A and 302B to be reassigned during the instrument reassignment state.

When the control system 108 detects activation of the instrument reassignment input, the processing device may compute actual positions of instruments and tool manipulators, as part of an operation 504 of the method 500, in which proxies for the actual positions of the instruments and manipulators are computed by the processing device. These actual positions may include locations and orientations of the instruments and tool manipulators as obtained based on various sensor components included therein. Using the kinematic information and visual information from the endoscope 222, the control system 108 may generate the proxy positions for the instruments and tool manipulators, assigning these features corresponding positions in the endoscopic reference frame. Thus, while the instruments have actual positions in the operational site and the manipulators have actual positions in a workspace associated with the operator, proxy positions relate the manipulators to the operational site and to instruments actually positioned therein. Registration between the endoscopic reference frame and the kinematic frame of the assembly 102 may allow actual positions to be computed into proxy positions to facilitate representation and reassignment of control between the tool manipulators and the instruments. For example, the control system 108 may determine proxy positions of the instruments as visible in the physician's view (endoscopic frame of reference) via the display system 320. The proxy positions may include orientation information, location information (two-dimensional or three-dimensional), or both orientation and location information. The control system 108 may also determine proxy positions of the master controllers 302 within the three-dimensional space of the interventional site. The actual positions of the master controllers 302 may be defined in a workspace associated with the master console 106. These actual positions may be mapped into an eye coordinate frame of the associated with the view in the display system 320, which is provided by the endoscope 222. The mapping shares the same conventions as the view frame/endoscope tip frame, such that up in workspace associated with the master console 106 corresponds to the eye coordinate frame, which in turn corresponds to up in the endoscope tip frame, for example. The origin in the eye coordinate frame may be located between the lenses of the display system 320 and, correspondingly, between the lenses of the endoscope tip. Initial proxy positions of the master controllers in the unified reference frame (e.g., the endoscopic reference frame) may be based on the instruments that master controllers are assigned to control at the time activation of the instrument reassignment input is detected.

Figure 6A:
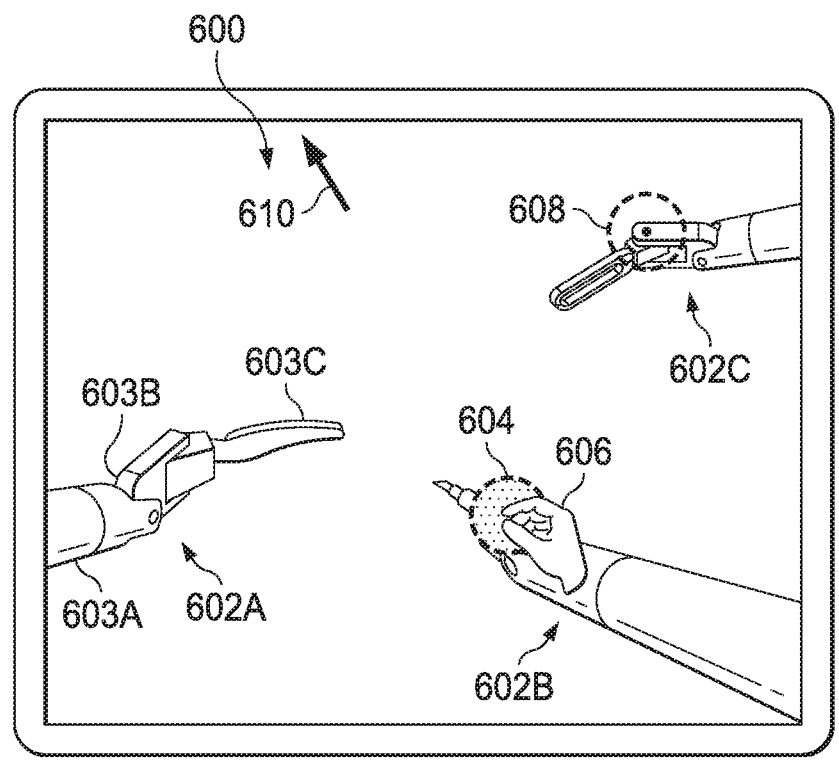

To more clearly explain aspects of the method 500, reference is made to FIGS. 6A-D and FIGS. 7A-D, shown therein are images that correspond to the operator's view in the display system 320 and views of corresponding positions and movements of the operator's hands during use of the console master controllers 302, respectively. FIG. 6A depicts the physician's view 600 of the interventional site at the time that the control system 108 detects activation of the instrument reassignment input (e.g., button activation, elbow pad activation or foot pedal switching). Three instruments (602A, 602B, and 602C) are shown in the view 600, which may be provided by a camera in another instrument, i.e. endoscope 222 of FIG. 2. The instruments 602A-C may be any of the instruments 320A-D shown in FIG. 2. As shown in FIG. 6A, each of the instruments includes a shaft portion 603A, a wrist portion 603B, and a distal feature portion or end effector portion 603C.

The view 600 may be augmented by the control system 108 with digital overlays of various indicators in the display system 320. The indicators overlaid in the view 600 may be displayed in projected positions within three-dimensional space defined by a calibrated, stereoscopic camera model. The positions of the indicators correspond to proxy positions of the instruments and master controllers. The display system 320 may depict indicators representing the assignment status of various instruments, which may indicate which instruments are assigned and which instruments are unassigned, as well as the master controller 302 to which a particular assigned instrument is assigned. The indicators may include representational icons or may include enhancements of features visible in the view. For example, instruments may be outlined, highlighted, or shaded with a particular color or pattern to indicate the type of instrument, the assignment status of the instrument, etc.

Figure 7A:
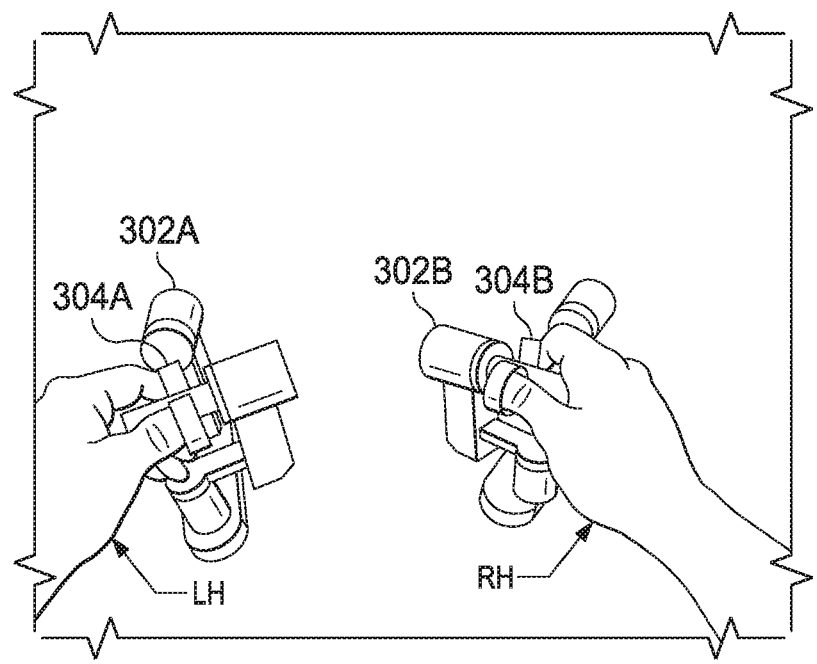
Figure 6B:
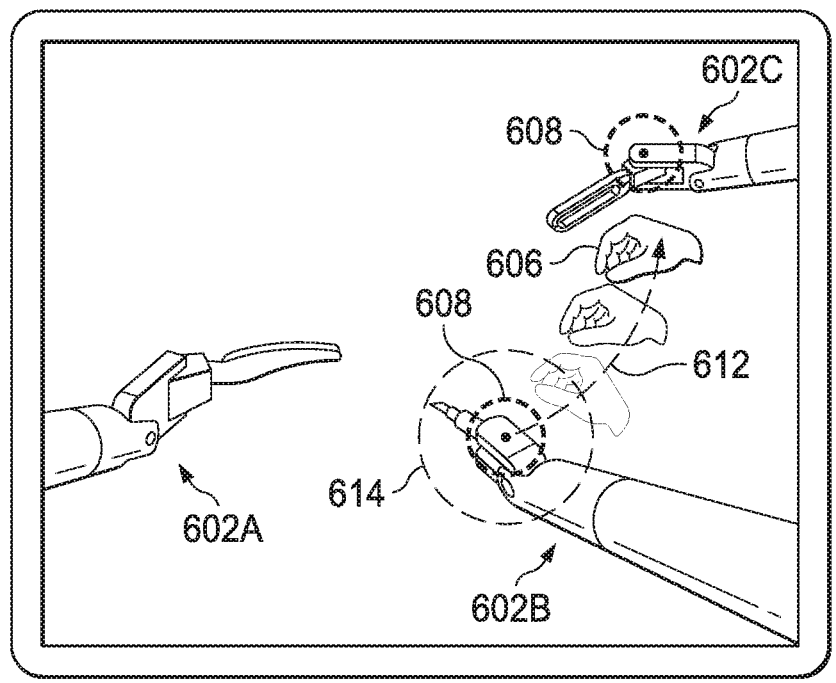

FIG. 6A includes an assignment indicator 604, showing that the instrument 602B is assigned to one of the master controllers 302, and a selection indicator 606, shown as a grasping hand. The selection indicator 606 may be shown by a visual representation of the master controller or by another user interface element, in other embodiments. The proxy position of the master controller may be used to determine the position of the selection indicator 606, which is shown as grasping at the center of the assignment indicator 604, and may indicate that instrument 602B is assigned to the master controller 302B. In other words, FIG. 6A shows the proxy position of the master controller 302B as coinciding with the proxy position of the instrument 602B. As depicted, the selection indicator 606 is a right hand indicator, communicating to the physician that the right hand master controller (master controller 302B) is assigned to the control of instrument 602B. FIG. 7A shows the position of the physician's left hand (LH) and right hand (RH) in the workspace reference frame, which are engaged in the master controllers 302A and 302B, respectively, to control the instruments 602A and 602B, respectively. FIG. 6B also includes a reassignment candidate indicator 608, which identifies a candidate that is not currently assigned to either of the master controllers 302. In some embodiments, when a particular master controller 302 has been selected for reassignment, all of the instruments that are unassigned can be highlighted with a candidate indicator, like the candidate indicator 608. In some instances, only a subset of the unassigned instruments 602 may be suitable candidates, for example only those unassigned instruments 602 that are suitable for control by the physician's right hand RH may be represented by reassignment candidate indicators. Given the orientation of instruments around the interventional site, some instruments are only candidates for control by the right-hand master controller 302B and not the left-hand master controller 302A.

FIG. 6A may also include an off-screen instrument indicator 610 to alert the physician to the presence of an instrument (e.g., an instrument 602D) that is present at the interventional site but that is outside of the view 600 as provided by the endoscope 222. The off-screen instrument indicator 610 may include a directional component that points to the location of the instrument 602D and indicates the orientation of the instrument 602D. A proxy position of the out-of-view instrument 602D may be computed and translated into the endoscopic reference frame and represented in the view 600 by the off-screen instrument indicator 610. In general, the positions of the indicators 606, 608, and/or 610 may be determined by the control system 108 and rendered in a three-dimensional space defined by the view 600 of the interventional site to allow to physician to interact with the tools represented by the indicators.

In some embodiments, the instrument 602D may be selected for reassignment by interaction between the selection indicator 606 and the off-screen instrument indicator 610, in a manner like that describe herein with respect to FIG. 602C. In some embodiments, when an off-screen instrument, like instrument 602D is selected by selecting the indicator 610, the instrument 602D may be subsequently operated in a limited instrument control mode. For example, the instrument 602D may be moved along an insertion axis only. Commands from the master controller 302 to manipulate the wrist or the end effector of the instrument 602D may be ignored or suppressed by the control system. In some embodiments, the control system 108 may impose limits on the amount of movement permissible to the instrument 602D or haptic feedback (such as a resistive force that provides viscous drag) can be provided to communicate the need for caution when manipulating an off-screen instrument. Additional control or full control may be provided after the instrument 602D becomes visible in the view 600.

Returning to the method 500, at operation 506, the processing device may receive input from a master controller 302 that indicates a selection of an instrument from among the plurality of selectable instruments or an association of the master controller 302 with an unassigned instrument. The input indicating a selection or an association may include several input components. For example, a first input component may indicate that the physician wants to disassociate the master controller 302B from the instrument 602B and a second input component may indicate that the physician wants to associate the master controller 302B with the instrument 602C.

Figure 7B:
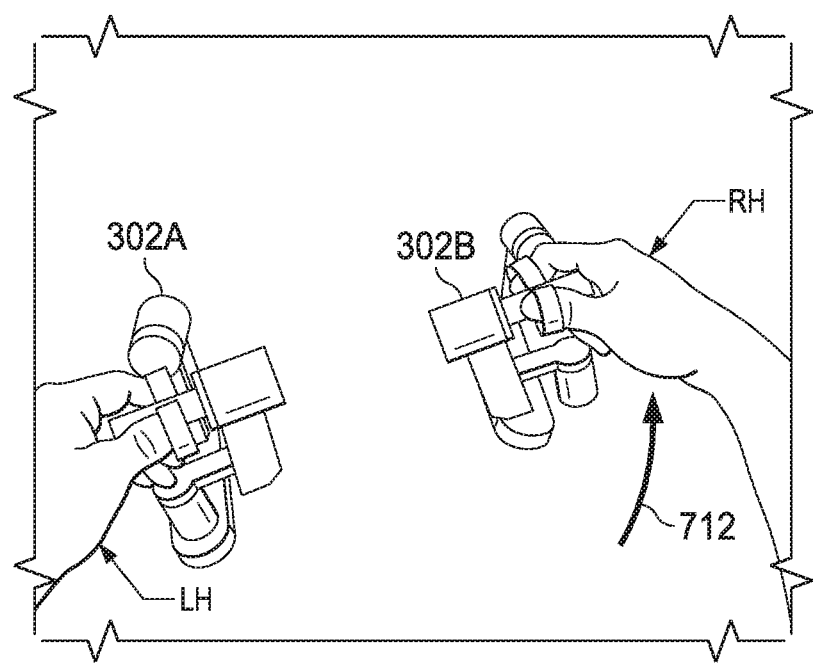

As shown in FIGS. 6B and 7B, the control system 108 may receive a motion based input from the master controller 302B, as the physician moves the master controller 302B to a location associated with the unassigned instruments 602C. This may be done by moving the master controller 302B, such that a proxy position thereof moves or aligns to a proxy position of instrument 602C. This motion based input may include the first input component and the second input component. As the physician moves the master controller 302B along a path 712, the selection indicator 606 (associated with the proxy position of the master controller 302B) moves along a corresponding path 612, providing the physician with visual feedback of the movement of the master controller 302B relative to the instruments 602. The selection indicator 606 changes position and orientation in the view 600 as the master controller 302B is moved. In order to effect a reassignment, the physician may move the master controller 302B so that the selection indicator 606 becomes aligned with the candidate indicator 608. In doing so, the physician may move the selection indicator 606 outside of a boundary 614 that is associated with the instrument 602B. This may be the first input component, which entails a disassociation of the master controller from the previously assigned instrument 602B. As depicted in FIG. 6B, the boundary 614 may be a spherical boundary in some embodiments, and generally circular in other embodiments. The boundary 614 may or may not be shown to the physician in the view 600. When the selection indicator 606 moves outside of the boundary 614, the assignment indicator 604 may change to a candidate indicator 608, like that associated with the instrument 602C. The control system 108 may thereafter treat the instrument 602B as an unassigned instrument.

Figure 6C:
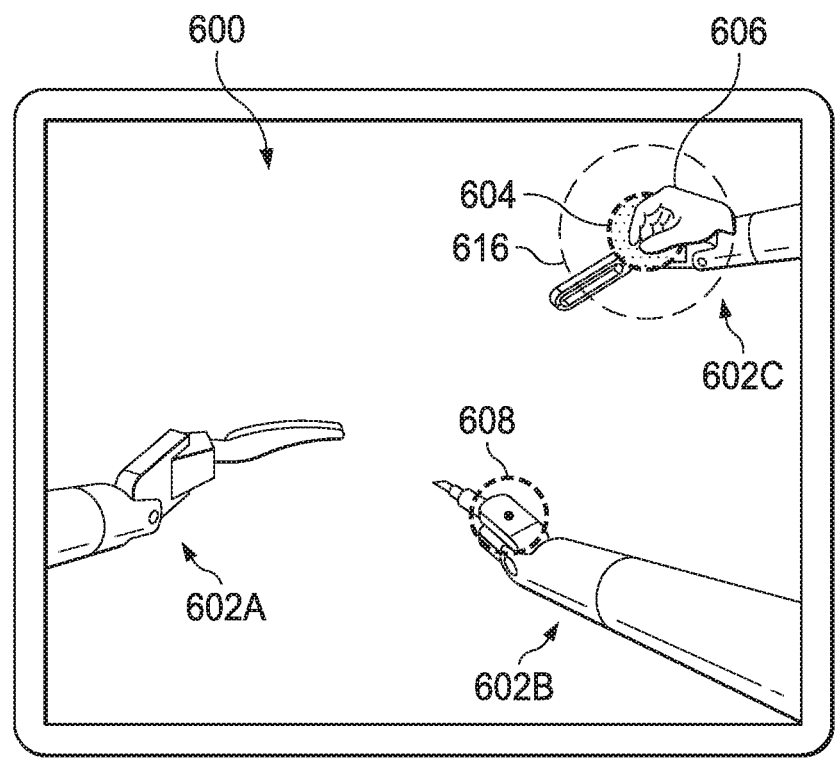
Figure 7C:
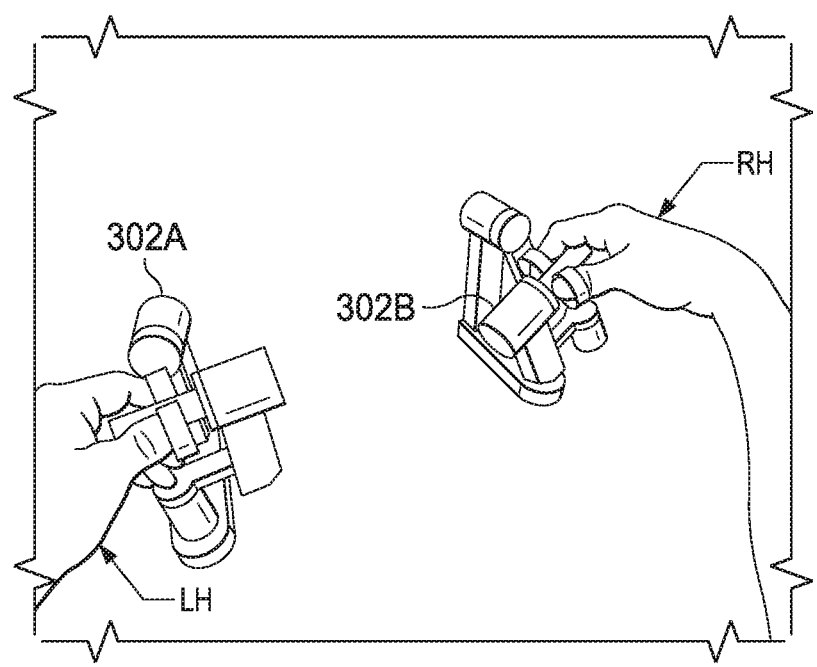

Referring now to FIGS. 6C and 7C, when the selection indicator 606 is properly associated, by alignment in orientation and/or location of proxy locations by the physician's proper positioning of the master controller 302B, with the instrument 602C and its candidate indicator 608, an assignment indicator 604 may be displayed in connection with the instrument 602C, to communicate to the physician that the control system 108 has assigned the master controller 302B to control the instrument 602C. This may constitute the second input component. In some implementations, the assignment indicator 606 may be displayed when the physician positions the selection indicator 606 within a boundary 616 that surrounds center of the candidate indicator 608 or, in other words, when the proxy position of the master controller 302B is within a threshold of the proxy position of the instrument 602C. This threshold may be defined in terms of two-dimensional distance, three-dimensional distance, orientation, and/or combinations of these terms. The assignment indicator 604 may be shown in connection with the instrument 602C before the control system 108 actually has reengaged control by the master controller 302B, such that subsequent movement of the master controller 302B may prevent the assignment of control of the instrument 602C.

Figure 6D:
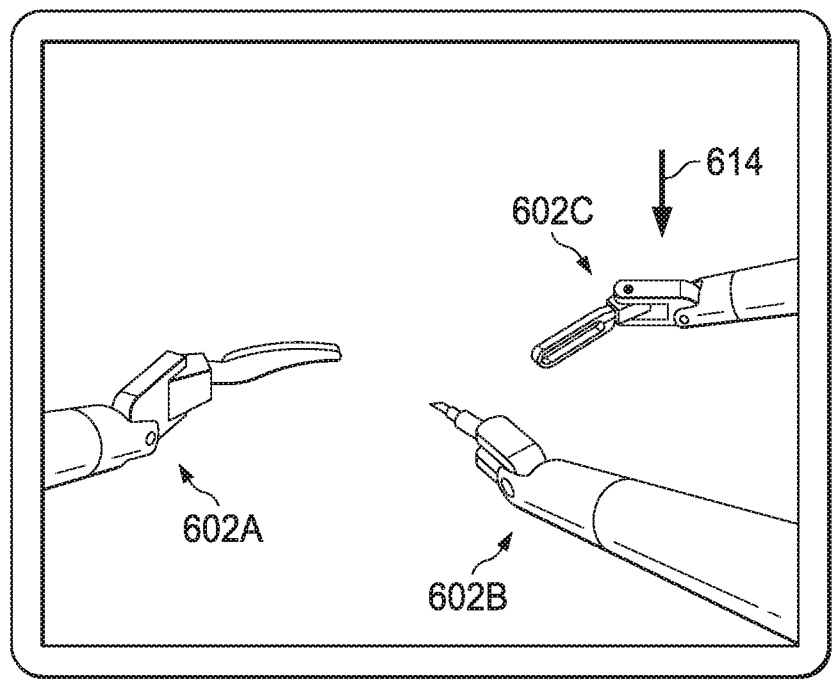
Figure 7D:
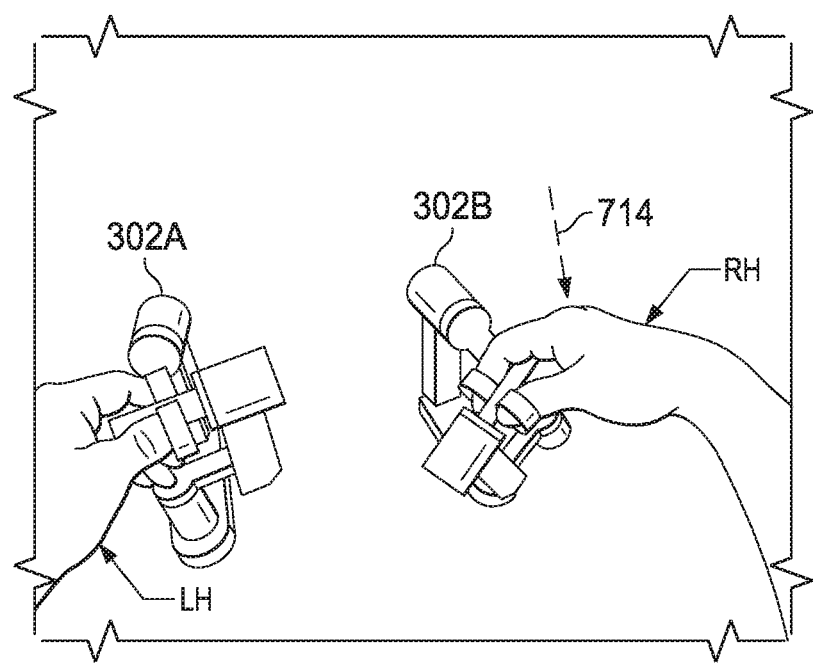

Returning to FIG. 5, the processing device may assign control of the selected instrument 602C to the master controller 302B based on the association brought about by the received input, at operation 508. When the activation of the instrument reassignment input is detected at operation 502, this may be detected by identifying an interaction with the elbow pad 308B or other activation input of FIG. 3. The user may release the elbow pad 308B or activate the elbow pad 308B again in order to affect the change. Thereafter, the instrument reassignment state may be terminated by the control system 108 and a standard operational state may be entered, such that subsequent manipulation of the master controller 302B causes movement of the instrument 602C along a path 614 as shown in FIG. 6D, the movement caused by the movement along the path 714 of the master controller 302B as shown in FIG. 7D, at operation 510.

In some embodiments of the method 500, the control system 108 may compute boundaries, like the boundaries 614 and 616, associated with the instruments located in the interventional site. The boundaries may be computed according to the relative distances between the instruments. For example, the boundaries associated with the instruments 602B and 602C may be smaller than boundaries associated with the instruments 602A and 602D (not shown in the view 600) because the instruments 602B and 602C are closer to each other than the instruments 602A and 602D are. Additionally, proximity measures may be determined between the proxy positions of each of the master controllers 302 (or only of the active master controller 302) and the proxy positions of the instruments 602. The proximity measures may be measured as linear and/or angular components and can be determined in three-dimensions or in two-dimensions. When the proxy positions and proxy measurements therebetween are determined in two-dimensions, only the two-dimensional position and orientations may be used for determining associations of instruments and master controllers, even though the master controller moved beyond an XY plane.

In order to aid the physician in aligning the selection indicator 606 with the candidate indicator 608 of an instrument to be selected, the control system 108 may provide haptic feedback to the physician via the master controller 302 by exerting a force using actuators in the master controller 302 that move the master controller 302 (and the physician's hand) into alignment with a candidate instrument. For example, when the selection indicator 606 enters the boundary 616 as shown in FIG. 6C, the control system 108 may cause the master controller 302B to drift or move towards the proper alignment associated with the instrument 602C. When such haptic feedback is provided, the change in the control assignment of the selected instrument, at operation 508, may be performed before additional instrument reassignment input is received from the foot pedals 306, the elbow pads 308, or the buttons 418 on the master controllers 302. However, actual control of the instrument 602C may not begin until the master controller 302 completes its drift or movement toward the proper alignment. By providing the haptic feedback only when the master controller 302 is near a final position for reassignment, such as within the threshold or boundary 616, the control system 108 may avoid surprise and or discomfort to the physician if the final position of the master controller 302 results in a non-ergonomic pose of the operator's hand. When the haptic feedback is provided, the associated force may be large enough to provide guidance to the physician, but small enough that it may be easily overcome by the physician, if the feedback tends to position the master controller 302 in alignment with an undesired instrument.

In computing the proxy positions of instruments and master controllers at operation 504, the control system 108 may ensure that the locations and orientations (which may both be included in the proxy positions) uniquely identify a single component, i.e. a single instrument or master controller. In some instances, some of the instruments 602 shown in the endoscopic view 600 may visually overlap, making them difficult to distinguish, which may make selection among the overlapping instruments more difficult. In such instances, the proxy position associated with an instrument can be moved further up the shaft of the instrument, rather than being defined at a distal end of the shaft, at a wrist of the instrument, or at an end effector base or tip. In general, because the dimensions of the interventional site are significantly smaller than the volume in which the master controllers can be moved, the movement of the selection indicator 606 may be scaled and then the movements may be performed as modified by the scale. In some implementations, the scaling may be non-linear or have a different scale applied such that movement of the master controller 302B along the path 712 (shown in FIG. 7B) is relatively shorter than the corresponding movement of the selection indicator 606 along the path 612 (shown in FIG. 6B). Or the orientation may be scaled non-linearly or using a different scale, such that the change in orientation applied by the physician's hand to the master controller may be relatively less than the change in orientation of the proxy position of the selection indicator 606. By applying a different scaling during control swapping than during operation, the control system 108 may help the physician better maintain ergonomic hand positions during the swap and for subsequent operational control of the newly selected instrument afterward.

In the event that an instrument reassignment input is detected (operation 502), proxy positions are computed (operation 504), but no input has been received that associates an master controller with a new instrument, the method 500 may either revert to the assignment in place at the time the instrument reassignment input was detected or the control system 108 may change the control assignment of the master controller 302 to be unassigned. If unassigned, the physician's movement of the particular master controller 302 may not be effected by the control system 108 with respect to any of instruments 602. Accordingly, some embodiments of the method 500 may result in a master controller 302 becoming unassigned to any instrument 602.

Referring now to FIGS. 8A-C and 9A-C, to more clearly explain other aspects of the method 500. Shown therein are images that correspond to the operator's view in the display system 320 (FIGS. 8A-C) and views of corresponding positions and movements of the operator's hands during use of the console master controllers 302 (FIGS. 9A-C) during a process of reassigning instrument control. The embodiment of the method 500 as shown in these figures depicts reassignment based on changes in the orientation of a master controller without regard to changes in the position of the master controller. FIG. 8A includes a view 800 from an endoscope, like the endoscope 222 of FIG. 2. The view 800 shows three instruments 802A, 802B, and 802C. The master controllers 302A and 302B shown in FIG. 9A are in locations (positions and orientations) that correspond to the locations (positions and orientations) of the instruments 802A and 802B. When the physician activates an instrument reassignment input to cause the control system 108 to enter an instrument reassignment state, the control system 108 determines proxy positions of the instruments 802A-C and the proxy positions of the master controllers 302. In this embodiment, the proxy positions may be defined by orientations, without respect to the locations.

FIG. 8A shows an assignment indicator 804 and associated selection indicator 806. The physician may manipulate the master controller 302B to alter its orientation, and as the orientation of the master controller 302B is changed, the selection indicator 806 is moved by the control system 108 in the digital overlay of view 800. The control system 108 compares the orientation of the master controller 302B with the orientation of candidate instruments, like the instrument 802C, and moves the selection indicator 806 toward the instrument having the most similar orientation. The proxy positions described by the orientations of instruments may be determined based on the shaft of the instruments, based on the wrist of the instruments, and/or based on the end effectors extending from the wrists. Thus, in some embodiments, an instrument 802 may have multiple proxy positions, which may each be displayed as a separate candidate indicator, like the candidate indicator 808, which is associated with the end effector of the instrument 802C in FIG. 8A. Accordingly, the control system 108 may move the selection indicator 806 toward the instrument having the proxy position with the most similar orientation.

FIG. 8B shows the selection indicator 806 moving along a generated path 810 between the candidate indicator 808 that is associated with the instrument 802B and the candidate indicator 808 that is associate with the instrument 802C. The path may be provided by a spline or barycentric interpolation between end points defined by the proxy positions of the master controller 302B and the instrument 802C, with an interpolation parameter based on the orientation error or difference in proxy orientations. The movement path 902 of the physician's right hand, shown engaged in master controller 302B, that results in the movement of the indicator 806 is movement about one of the axis of the master controller 302B, as such the relative movement of the selection indicator 806 is significantly greater than the relative movement of the master controller 302B. As discussed herein, haptic feedback can be provided via actuators in the master controllers 302 to help guide the physician toward a reassignment candidate. When the reassignment is based on the orientation, but not position, the haptic feedback may be provided as a torque that attracts the physician's hand in the master controller 302 toward the orientation or relative orientation required to reassign the master controller 302 to a candidate instrument 802, without including substantial translational movement of the master controller 302.

As shown in FIG. 8C, when the selection indicator 806 is positioned at the instrument 802C, the display 320 includes an assignment indicator 804 associated with the instrument 802C. More specifically, the assignment indicator 804 is associated with the end effector of the instrument 802C. FIG. 9C shows the terminal position of the master controller 302B by the physician's right hand along the path 902. The physician may provide an input to trigger the change in control to the instrument 802C, such as the release of the elbow pad 308B or a foot pedal, or the depression or release of the button 418. Alternatively, by holding the master controller 302B in the appropriate position for more than a threshold amount of time (e.g., 2 seconds, 5 seconds, etc.), the control system 108 may automatically switch from the instrument reassignment mode to an operational mode, such as the instrument control mode.

FIGS. 10A-B and 11A-B depict another embodiment of the method 500. FIG. 10A depicts a swap or reassignment of control by the master controller 302A from the instrument 1002A to the instrument 1002C. In order to bring the master controller 302A into alignment with the instrument 1002C to reassign control of the instrument 1002C to the master controller 302A (in other words to bring the selection indicator 1006 into alignment with an assignment indicator of the instrument 1002C for reassignment), the physician may be required bring his left hand into a non-ergonomic position, as shown in FIG. 11A, according to some embodiments. This position may cause the proxy location and orientation of the master controller 302A to align with the proxy position of the instrument 1002C, which may use the position and orientation of the wrist or end effector as a proxy position. A successful assignment by the control system 108 results in the display of the assignment indicator 1004 as shown in FIG. 10A. In such embodiments, the physician may clutch the control of the master controller 302A, so that the physician may move the master controller 302A into a more natural position, before engaging control of the instrument 1002C. Accordingly, the physician may be required to position the left hand in a non-ergonomic position for only a brief amount of time.

However, in other embodiments, the instrument under control may be swapped between the instruments 1002A and 1002C, by a different association. The proxy locations of the master controller 302A and the instrument 1002C may be utilized to make the assignment, but utilizing different aspects of the proxy locations. In such embodiments, the physician may manipulate the master controller 302A such that the tip of the selection indicator 1006 coincides with the location of the tip of the instrument 1002C. This may be done without respect to the orientations included in the proxy position information or the orientations may be required to be anti-parallel to each other, such that the selection indicator 1006 points toward the tip of the instrument 1002C, rather than in the same direction as the tip of the instrument 1002C. When this is done, the assignment indicator 1004 associated with the instrument 1002C may decrease in size to accommodate the overlay of the assignment indicator 1008, to show that the control system 108 has associated the master controller 302A with the instrument 1002C using alternative reassignment approach that is either independent of the proxy orientations or permits anti-parallel alignment of proxy orientations. The selection of the instrument 1002C may result in a fixed offset transform enacted by the control system 108 between the master controller 302A and the instrument 1002C during subsequent use of the instrument 1002C. So that the instrument 1002C can be controlled by the master controller 302A in the position shown in FIG. 11B, rather than in the position shown in FIG. 11A. Accordingly, the instrument 1002C may not need to be clutched to permit the master controller 302A to move to a more ergonomic position prior to control being resumed.

FIG. 10B also depicts another instrument control point represented by the assignment indicator 1010. As depicted, the assignment indicator 1010 extends along the shaft of the instrument 1002C. The physician O may cause the selection indicator 1006 to be associated with the assignment indicator 1010 to reassign the master controller 302A to the instrument 1002C. When the assignment indicator 1010 is used for the association, the control assigned to the master controller 302A may be limited in one or more respects. For example, the physician O's manipulator of the master controller 302A may be processed by the control system 108 so that along linear translation of the instrument 1002C along an axis defined by the shaft of the instrument 1002C is permitted. Other motions of the master controller 302A may be filtered out, such that the instrument 1002C may translate along the axis without affecting the orientation of the tip or a state of the end effector, such as an open or closed state of forceps. Alternatively, using the master controller 302A to grasp to the assignment indicator 1010 may permit X, Y, Z axis motion, while the control system 108 filters out any rotational motion that would result in a change in orientation of the instrument 1002C or a change in the state of the end effector, such as a closed state of forceps. Accordingly, the nature or degree of the control reassigned from one instrument to another may depend on the particular indicator or type of indicator used in the re-association using the selection indicator.

As described herein, swaps may be performed based on the proxy positions of the instruments and master controllers with respect to both the location and orientation included in the proxy positions or with respect to either the position or the orientations in the proxy positions. In some embodiments, the requirements of a swap may be selected by the user. For example, the user may depress an elbow pad 308 once for a particular instrument reassignment mode and twice for a different reassignment mode. For example, in a first reassignment mode, the control system 108 may make associations based only on proxy orientations. In a second reassignment mode, the control system 108 may make associations based only on proxy locations. Additionally, the proxy positions used for swapping control may include different constraints. For example, the instrument 1002C may have multiple proxy positions, e.g., a first control point for the shaft, a second control point for the wrist, and a third control point for the end effector. The physician may select the proxy position/control point based on what the physician intends to do with the selected instrument. For example, by selecting the proxy position/control point associated with the shaft of the instrument 1002C, the physician may be able to use the reassigned master controller 302A for translation of the shaft, but not to reorient the shaft. The control system 108 may perform any commands relating to the translation of the shaft of the instrument 1002C along an insertion axis, but not perform any commands relating to the orientation of the shaft or the wrist. Such a limited control mode may also result depending on how the instrument 1002C was selected, i.e., whether the master controller 302 was oriented the same way as the proxy position of the instrument 1002C. If the master controller 302 shared the orientation of the proxy position of the instrument 1002C when control was switched from another instrument, the master controller 302 may be used by the physician to change the orientation of the instrument 1002C.

Additionally, the boundaries 614 and 616 as described with respect to FIGS. 6B and 6C may be included in embodiments of the method 500 as described with respect to FIGS. 8A-C and 9A-C as well as FIGS. 10A-B and 11A-B and may represent thresholds used in determining associations and in providing haptic feedback. The haptic feedback or haptic cues may be provided to help guide the physician's movements toward a most-likely swap candidate, such that the master controller is positioned in a way that corresponds to the view of the reassigned instrument as seen in the display system 320. This may make resuming control of the reassigned instrument more intuitive to the physician. Furthermore, visual feedback may be provided in the display system 320, such as an arrow that points from the instrument previously under control to the instrument indicated by the intervening and on-going movements indicating by the physician's movements of the master controller 302 or visual representations of the paths of movement like path 810 of FIG. 8B and path 612 of FIG. 6B.

Some embodiments of the teleoperational medical system 100 of FIG. 1 include additional consoles and additional displays, such as auxiliary displays that may be visible to others in the surrounding room. The overlaid indicators and visuals described herein and shown in the accompanying figures may appear on these additional consoles/displays in order to facilitate collaboration between the clinicians present during a procedure. For example, in a mentoring scenario, a mentoring physician might perform an exemplary step and then release the utilized instrument by unassigning their master controller, which may indicate to the physician at the other console that the instrument is now available to be grasped and controlled. The control systems 108 of the two console may be linked together to enable communication of instrument assignments between the consoles. Both consoles may be linked to the assembly 102 such that either or both of the consoles may be used to control the arms 210 and instruments 220. The control systems of multiple consoles may also communicate together to provide for collaborative control of a single instrument by two or more master controllers. Two selection indicators, one associated with a master controller from a first console and another associated with the master controller of a second console, may be moved to select the same instrument. By grasping it in a "hand-over-hand" manner as shown in FIG. 12.

FIG. 12 depicts a view 1200 that may be shown in the display systems 320 of at least two consoles, like the console 106. The view 1200 may be shared identically by both consoles or may include differences based on the particular console. As shown in FIG. 12, the view 1200 depicts three instruments, instruments 1202A, 1202B and 120C. The view 1200 further includes overlays identifying assignment indicators, selection indicators, and candidate indicators. The view 1200 shows a selection indicator 1206A associated with a master controller on a first console and a selection indicator 1206B associated with a master controller on a second console. The proxy positions associated with the master controller of first console and the master controller of the second console may be mapped to the same reference frame so that they can be displayed properly in the view 1200. FIG. 12 also shows assignment indicators 1204A and 1204B, which visually communicate that the master controller associated with the selection indicator 1206A is assigned to the instrument 1206C and that the master controller associated with the selection indicator 1206B is also assigned to the instrument 1206C, or will be effectively assigned by communicating control systems or by a single control system 108 when an instrument reassignment mode is terminated. As depicted in FIG. 12, the selection indicator 1206B is visually larger than the selection indicator 1206A. Similarly, the assignment indicator 1204B is larger than the assignment indicator 1204A. When control of the teleoperational assembly 102 is shared by two consoles, the shared view 1200 may include visual cues to help distinguish between the consoles. For example, the sized of the indicators 1206 and 1204 may vary between the views 1200 on the console. For example the indicators associated with each console may be depicted as visually larger on each console that the indicators associated with the other console. The indicators may be distinguished by color, shape, highlighting, transparency, pattern, or any other means suitable to allow the physicians and others to know which indicators are associated with which console.

When control is shared, the control system 108 may prioritize or blend control commands from the physicians' master controllers (such as a mentor's master controller and a mentee's master controller) when maneuvering the instrument 1202C. In some instances, one console may be able to assert complete control of the instrument 1202C, such that the commands from the other console are ignored or filtered out. The commands may be blended or combined equally or may be combined according to specified command contributions, such that the motion of the mentor's master controller contributes more to the effected command that does the motion of the mentee's master controller. Haptic feedback may be provided to the master controllers so that the mentee can feel forces associated with the mentor's movements and/or so that the mentor can feel forces associated with the mentee's movements. In some instances, the command contribution from either the mentor master controller or the mentor master controller may be set to zero, such that command is not shared, but haptic feedback communicates the movements performed by the active console's master controller to the passive console's master controller.

One or more elements in embodiments of the invention may be implemented in software to execute on a processor of a computer system such as control processing system. When implemented in software, the elements of the embodiments of the invention are essentially the code segments to perform the necessary tasks. The program or code segments can be stored in a processor readable storage medium or device that may have been downloaded by way of a computer data signal embodied in a carrier wave over a transmission medium or a communication link. The processor readable storage device may include any medium that can store information including an optical medium, semiconductor medium, and magnetic medium. Processor readable storage device examples include an electronic circuit; a semiconductor device, a semiconductor memory device, a read only memory (ROM), a flash memory, an erasable programmable read only memory (EPROM); a floppy diskette, a CD-ROM, an optical disk, a hard disk, or other storage device, The code segments may be downloaded via computer networks such as the Internet, Intranet, etc.

Note that the processes and displays presented may not inherently be related to any particular computer or other apparatus. Various general-purpose systems may be used with programs in accordance with the teachings herein, or it may prove convenient to construct a more specialized apparatus to perform the operations described. The required structure for a variety of these systems will appear as elements in the claims. In addition, the embodiments of the invention are not described with reference to any particular programming language. It will be appreciated that a variety of programming languages may be used to implement the teachings of the invention as described herein.

While certain exemplary embodiments of the invention have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art.

What is claimed is:

1. A teleoperational robotic system comprising:
a teleoperational assembly;
a master controller configured to receive input from an operator; and
a plurality of instruments supported by the teleoperational assembly, wherein the instruments are controllable by a control system based on the received input and wherein the control system is configured to reassign control by the master controller of a first instrument to a second instrument by:
detecting activation of an instrument reassignment input,
computing, by the control system, proxy positions of at least a first instrument and a second instrument of the plurality of instruments,
computing a proxy position of the master controller, and
receiving a user input including a disassociation input component and an association input component at the master controller,
the disassociation input component including a movement of the master controller to move the proxy position of the master controller outside of a first boundary of a first threshold distance of the proxy position of the first instrument,
the association input component including a movement of the master controller to move the proxy position of the master controller within a second boundary of a second threshold distance of the proxy position of the second instrument,
unassigning control of the first instrument from the master controller when the proxy position of the master controller is moved outside of the first boundary of the first threshold distance, and
assigning control of the second instrument to the master controller when the proxy position of the master controller is moved within the second boundary of the second threshold distance, wherein the second boundary is spaced from the first boundary.

2. The robotic system of claim 1, wherein the first and second instruments are medical instruments.

3. The robotic system of claim 1, wherein the proxy position of the second instrument is included in a set of proxy positions having:
a first proxy position associated with a shaft of the second instrument;
a second proxy position associated with a wrist mechanism of the second instrument; and
a third proxy position associated with a distal feature of the second instrument.

4. The robotic system of claim 1, wherein the plurality of instruments includes an imaging device and the proxy positions of the first instrument and the second instrument are defined relative to a view obtained from the imaging device.

5. The robotic system of claim 1, wherein the plurality of instruments includes a stereoscopic camera that defines a three-dimensional area, the proxy positions of the first and second instruments being defined in the three-dimensional area.

6. The robotic system of claim 1, wherein the proxy position of the first instrument is utilized as the proxy position of the master controller while the master controller is assigned to control the first instrument.

7. The robotic system of claim 1, wherein the control system is further configured to display a first selection indicator associated with the master controller.

8. The robotic system of claim 7, wherein movement of the master controller along a path moves the first selection indicator along a corresponding path to provide visual feedback of the movement by the master controller relative to the second instrument.

9. The robotic system of claim 1, wherein the association input component indicates an association between the proxy position of the master controller with the proxy position of the second instrument and wherein assigning control of the second instrument to the master controller based on the association comprises assigning a type of control of the second instrument based on a type of the association.

10. The robotic system of claim 9, wherein the type of the association is one of: an orientation-based association, a location-based association, and an orientation-based and location-based association.

11. The robotic system of claim 9, wherein the type of control is control limited to X, Y, and Z-directions of motion of the second instrument.

12. The robotic system of claim 9, wherein the type of control is control of an end effector and a wrist mechanism of the second instrument.

13. The robotic system of claim 9, wherein the control system is further configured to provide a haptic feedback via the master controller, the haptic feedback corresponding to the association between the proxy position of the master controller and the proxy position of the second instrument.

14. The robotic system of claim 13, wherein the haptic feedback comprises a force exerted by the master controller that tends to cause the master controller to move toward the proxy position of the second instrument.

15. The robotic system of claim 13, wherein the haptic feedback comprises a torque exerted by the master controller that tends to cause the master controller to become oriented so as to correspond to an orientation indicated by the proxy position of the second instrument.

16. The robotic system of claim 7, wherein the control system is further configured to:
compute, by the control system, a proxy position of an additional master controller;
receive, by the control system, a user input at the additional master controller associating the proxy position of the additional master controller with the proxy position of the second instrument; and
assign, by the control system, control of the second instrument to the master controller and the additional master controller.

17. The robotic system of claim 16, wherein the master controller is coupled to a first console and the additional master controller is coupled to a second console.

18. The robotic system of claim 16, wherein assigning control of the second instrument to the master controller and the additional master controller comprises determining command contributions of the master controller and the additional master controller.

19. The robotic system of claim 18, wherein the control system assigns a larger command contribution to the master controller than to the additional master controller.

20. The robotic system of claim 16, wherein the control system is further configured to display the first selection indicator associated with the master controller and a second selection indicator associated with the additional master controller in at least two display systems.

\* \* \* \* \*